(12) United States Patent
Fitz-Coy et al.

(10) Patent No.: US 10,005,569 B2
(45) Date of Patent: Jun. 26, 2018

(54) TRIPLE FLYWHEEL ASSEMBLY WITH ATTITUDE JITTER MINIMIZATION

(71) Applicant: UNIVERSITY OF FLORIDA RESEARCH FOUNDATION, INC., Gainesville, FL (US)

(72) Inventors: Norman G. Fitz-Coy, Gainesville, FL (US); Vivek Nagabhushan, Santa Clara, CA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 241 days.

(21) Appl. No.: 14/900,893

(22) PCT Filed: Jul. 2, 2014

(86) PCT No.: PCT/US2014/045221
§ 371 (c)(1),
(2) Date: Dec. 22, 2015

(87) PCT Pub. No.: WO2015/003044
PCT Pub. Date: Jan. 8, 2015

(65) Prior Publication Data
US 2016/0137318 A1 May 19, 2016

Related U.S. Application Data

(60) Provisional application No. 61/842,064, filed on Jul. 2, 2013.

(51) Int. Cl.
*B64G 1/28* (2006.01)
*F16F 15/30* (2006.01)
*B64G 1/22* (2006.01)

(52) U.S. Cl.
CPC ............. *B64G 1/285* (2013.01); *B64G 1/283* (2013.01); *B64G 1/286* (2013.01); *F16F 15/30* (2013.01); *B64G 2001/228* (2013.01)

(58) Field of Classification Search
CPC ........ B64G 1/285; B64G 1/286; B64G 1/283; B64G 2001/228; F16F 15/30
See application file for complete search history.

(56) References Cited

U.S. PATENT DOCUMENTS

| 4,723,735 A | 2/1988 | Eisenhaure et al. |
| 5,826,829 A | 10/1998 | Holmes |

(Continued)

FOREIGN PATENT DOCUMENTS

WO   WO-2017116699 A1 *  7/2017  .............. F16F 15/30

OTHER PUBLICATIONS

Anderson, Eric H., et. al, "Satellite Ultraquiet Isolation Technology Experiment (SUITE): Electromechanical Subsystems", Proceedings of SPIE Conference on Industrial and Commercial Applications of Smart Structures Technologies, Mar. 1999, pp. 308-328, vol. 3674, U.S.A.

(Continued)

*Primary Examiner* — Valentina Xavier
(74) *Attorney, Agent, or Firm* — Alston & Bird LLP

(57) ABSTRACT

Various embodiments of the present invention include assemblies and methods for minimizing the amplitude of attitude jitter. In one embodiment, a flywheel assembly for reducing the amplitude of attitude jitter is provided. The flywheel assembly includes a first flywheel, a second flywheel, and a third flywheel. The first flywheel, second flywheel, and third flywheel are axially aligned and in operable engagement with one another. Each flywheel is configured to be independently controlled in order to manipulate the phase difference therebetween.

25 Claims, 15 Drawing Sheets

(56) References Cited

U.S. PATENT DOCUMENTS

| | | | |
|---|---|---|---|
| 8,876,060 B2 | 11/2014 | Nagabhushan et al. | |
| 2009/0039202 A1 | 2/2009 | Ogo et al. | |
| 2010/0117375 A1* | 5/2010 | Kwok | F03G 3/08 290/1 R |
| 2011/0006162 A1* | 1/2011 | Sperandei | B64G 1/283 244/165 |
| 2012/0234981 A1* | 9/2012 | Nagabhushan | B64G 1/28 244/165 |
| 2015/0040717 A1* | 2/2015 | Miyagawa | H02K 7/025 74/572.11 |

OTHER PUBLICATIONS

Bradley, A. J., et al., "Determination and Characterization of the Hubble Space Telescope Pointing Stability", NASA STI/Recon Technical Report A, vol. 95, 1993, pp. 445-459; published in Spaceflight Dynamics 1993: vol. 84 Advances in Astronautical Sciences from the proceedings of AAS/NASA International Symposium, Greenbelt, MD, Apr. 26-30, 1993, Astronautical Society, U.S.A.

Cobb, Richard G., et al., "Vibration Isolation and Suppression System for Precision Payloads in Space", *Smart Materials and Structures*, 1999, pp. 798-812, vol. 8, IOP Publishing Ltd., U.K.

Hasha, Martin D., "Passive Isolation/Damping System for the Hubble Space Telescope Reaction Wheels", NASA—Lyndon B. Johnson Space Center, The 21st Aerospace Mechanisms Symposium, 1987, pp. 211-226, NASA, U.S.A.

Iwasaki, Akira, "Detection and Estimation of Satellite Attitude Jitter Using Remote Sensing Imagery", *Advances in Spacecraft Technologies*, 2011, pp. 257-272, Intech, U.K., retrieved from <http://cdn.intechopen.com/pdfs/13478/InTech-Detection_and_estimation_satellite_attitude_jitter_using_remote_sensing_imagery.pdf> on Dec. 9, 2015.

Liu, Kuo-Chia, et al., "Reaction Wheel Disturbance Modeling, Jitter Analysis, and Validation Tests for Solar Dynamics Observatory," AIAA Guidance, Navigation and Control Conference and Exhibit, Aug. 18-21, 2008, 18 pages, American Institute of Aeronautics and Astronautics, U.S.A.

Masterson, Rebecca A., et al., Development and Validation of Empirical and Analytical Reaction Wheel Disturbance Models, Masters of Science Thesis for the Department of Mechanical Engineering, Jun. 1999, 197 pages, Massachusetts Institute of Technology, U.S.A.

Nagabhushan, Vevek, et al., "Split Flywheel Design with Attitude Jitter Minimization Through Flywheel Phase Control", AIAA Infotech@Aerospace Conference, Apr. 6-9, 2009, pp. 1-13, American Institute of Aeronautics and Astronautics, U.S.A.

Pendergast, Karl J., et al., "Use of a Passive Reaction Wheel Jitter Isolation System to Meet the Advanced X-Ray Astrophysics Facility Imaging Performance Requirements", Proceedings of SPIE, vol. 3356, 1998, 17 pages, retrieved from <http://ntrs.nasa.gov/search.jsp?R=19980236616> on Dec. 9, 2015.

Ponslet, Eric, "System Level Modeling of the SNAP Instrument and Analysis of Reaction-Wheel-Induced Jitter", HTN-113005-0007, Hytec Incorporated, Dec. 14, 2000, 16 pages, U.S.A.

Skormin, V.A., et al., "Demonstration of a Jitter Rejection Technique for Free-Space Laser Communication", IEEE Transactions on Aerospace and Electronic Systems, Apr. 1997, pp. 568-576, vol. 33, No. 2, IEEE, U.S.A.

Teshima, Yu, et al., "Correction of Attitude Fluctuation of Terra Spacecraft Using ASTER/SWIR Imagery with Parallax Observation", IEEE Transactions on Geoscience and Remote Sensing, Jan. 2008, pp. 222-227, vol. 46, No. 1, IEEE, U.S.A.

International Searching Authority, International Search Report and Written Opinion for International Application No. PCT/US2014/045221, dated Oct. 27, 2014, 13 pages, Korean Intellectual Property Office, Republic of Korea.

\* cited by examiner (a) Full Simulation Plot (b) Plot Upto 0.1s

TRIPLE FLYWHEEL ASSEMBLY WITH ATTITUDE JITTER MINIMIZATION

CROSS REFERENCE TO RELATED APPLICATIONS

This application is a National Stage Application, filed under 35 U.S.C. § 371, of International Application No. PCT/US2014/045221 filed Jul. 2, 2014, which claims priority to U.S. Provisional Application No. 61/842,064 filed Jul. 2, 2013, the contents of both which as are hereby incorporated by reference in their entirety.

BACKGROUND

Related Field

Embodiments of the present invention relate to satellites and, more particularly, to a flywheel assembly for minimizing the amplitude of attitude jitter in satellites.

Related Art

Small satellites are evolving rapidly to augment the functions of larger satellites as well as individually perform some of the tasks such as stereo-imaging and directional communication which were earlier possible only by their larger counterparts. This evolution is gaining ground as attitude control actuators are being developed for smaller classes of satellites. Actuators based on the principle of momentum exchange, such as reaction wheels, momentum wheels and control moment gyroscopes (CMGs), have multiple spinning wheels or flywheels. The CMG is one such actuator that enables rapid retargeting and precision pointing, which are necessary for applications mentioned above. The CMG has flywheels mounted on gimbals which when actuated produce gyroscopic torque that is the control input for the attitude control system (ACS). A large amount of momentum must be stored in these flywheels to be able to produce torques large enough to achieve rapid retargeting. A single flywheel system according to various embodiments comprises a uniform flywheel supported by bearings and spun by a brushless DC motor and housed in a sealed casing. A single flywheel assembly 10 in its most basic form is shown by analogy in FIG. 1, although such should not be characterized as an illustration of prior art alone. This system could be used as a reaction wheel or as the flywheel for a CMG and/or modified according to various embodiments described herein.

A single flywheel system, however, may not maintain perfect balance during use. Along these lines, a single flywheel system may deteriorate over time so as to negatively affect the balance or symmetry of the flywheel system. As noted above, these flywheel systems are often used in spacecraft (e.g., small satellites), such as for attitude control. Any imbalance or loss of symmetry in the flywheel system may cause disturbances which may result in high frequency oscillations of the spacecraft and some structural elements. These oscillations are commonly known as jitter (i.e., vibration induced movements). Other sources of jitter include thruster firings, solar array drives, cryo-cooler pumps, antenna gimbal drives, and the like.

Where jitter or other vibrational movements occur, such may further have degrading effects on the performance of certain payloads, such as astronomical telescopes, Earth observation systems, optical communication equipment, and the like. The jitter may, as a non-limited example, cause smearing of images taken by a telescope under the influence of the jitter. To combat such effects, prior efforts have focused upon the external isolation of vibrations causing jitter and/or upon otherwise suppressing the same. Yet, even where isolation and/or suppression are achieved, some degree of jitter inevitably remains. Several conventional techniques are described, in turn, below.

As mentioned, several conventional methods exist to minimize the effect of jitter on spacecraft performance, which methods can generally be classified into direct and indirect methods. Direct methods reduce the magnitude of jitter at the source by making certain modifications to the rotary mechanisms. Direct methods can also be further classified into active and passive methods. Active methods employ isolation mechanisms to actively compensate for jitter. Passive methods make use of damped isolation mounts to secure the jitter causing mechanisms or employ damped oscillators elsewhere in the spacecraft. These mounts function like mechanical low pass filters that attenuate high frequency jitter. More recently, hybrid isolation systems that are a combination of passive and active isolation systems have been used to suppress jitter over a wide range of frequencies. Indirect methods may use post processing techniques along with onboard jitter measurement to refine jitter affected data.

Passive isolators are usually some form of viscoelastic material (e.g., rubber), or specially designed viscous dampers with variable stiffness and damping. These isolators are placed between the vibration source and the payload. The isolator functions as a mechanical low pass filter, absorbing the vibration energy at certain frequencies and thus decreases the magnitude of vibration seen by the payload. They provide reduced transmissibility only beyond the break frequency, and roll off as a second order system at 40 dB/decade. Although a low break frequency may provide isolation at lower frequencies, it reduces the stiffness of the supports. This can in certain instances make the payload vulnerable to large displacements during launch and collision with other spacecraft components. It may also introduce undesirable dynamics (rattle) during attitude control. Passive isolators have been used on many missions, including as a non-limiting example, on the Hubble Space Telescope.

Active isolators include electromechanical actuators such as voice coils, magnetic actuators, and piezo-electric stacks. Multiple such actuators are sometimes used in a hexapod configuration (e.g., Stewart platform) to provide multi degree-of-freedom isolation. The control of these actuators is based on feedback from accelerometers/force sensors mounted at the payload interface. These isolators provide great isolation at low frequencies, but are limited by the bandwidth of the actuators/control systems at higher frequencies. Active isolators require continuous power to isolate, and even support the payload. Thus, active isolators require some sort of a launch lock for restraint during launch. The performance of the active actuators further depends on vibration feedback sensors and control algorithms. The various components of the active isolators also add significant mass to the spacecraft.

Hybrid actuators provide an intermediate approach between active and passive approaches described above, in that they include a combination of active and passive isolators have been implemented to provide a wider bandwidth of isolation, and a steeper roll off. They may also be used to perform limited, but fine pointing of the payload. Hybrid actuators with adaptive damping based on shape memory alloys have also been developed. However, hybrid systems experience challenges encountered in both active and passive systems. Fast steering mirrors that compensate for vibration by dynamically altering the path of the optical beam have been used to compensate for jitter in optical communication, and imaging satellites.

Another method that also does not attenuate the vibration, is the use of post-processing techniques to restore jitter affected images [10]. This method, specific to imaging payloads, is not sufficient in itself and is typically used to augment the performance obtained by physical jitter reduction methods such as isolators.

It should be thus understood that the various existing and conventional jitter mitigation methods described immediately above merely provide features configured to reduce the effect of jitter on the payload, but they do not facilitate reduction and/or elimination of the jitter produced by the source itself. Thus, there is a need for an improved flywheel system that minimizes jitter at its source, without reliance upon externally imposed features to achieve isolation and/or suppression of effects of unaddressed jitter.

BRIEF SUMMARY

According to various embodiments, a flywheel assembly for reducing the amplitude of attitude jitter is provided. The flywheel assembly comprises: a first flywheel; a second flywheel; and a third flywheel. The first flywheel, the second flywheel, and the third flywheel are axially aligned and in operable engagement with one another; and each of the first, second, and third flywheels is configured to be independently controlled in order to manipulate the phase difference there-between.

According to various embodiments, a spacecraft is provided. The spacecraft comprises a flywheel assembly for reducing the amplitude of attitude jitter in the spacecraft. The flywheel assembly comprises: a first flywheel; a second flywheel; and a third flywheel. The first flywheel, second flywheel, and third flywheel are axially aligned and in operable engagement with one another, and each flywheel is configured to be independently controlled in order to manipulate the phase difference there-between.

According to various embodiments, a method for reducing the amplitude of attitude jitter is provided. The method comprises the step of providing a flywheel assembly. The flywheel assembly comprises: a first flywheel; a second flywheel; and a third flywheel, wherein the first flywheel, second flywheel, and third flywheel are axially aligned and in operable engagement with one another. The method further comprises the step of independently controlling each flywheel so as to manipulate the phase difference there-between.

According to various embodiments yet another flywheel assembly is provided. The flywheel assembly comprises a controller; a first flywheel; a second flywheel; and a third flywheel, wherein: the first flywheel, the second flywheel, and the third flywheel are axially aligned and in operable engagement with one another; each of the first, second, and third flywheels is configured to be independently controlled, via the controller, in order to manipulate the phase difference therebetween; and the controller is configured to cause rotation of the first flywheel to increase with respect to rotation of the second flywheel and cause rotation of the third flywheel to decrease with respect to rotation of the second flywheel for a predetermined period of time to reduce the amplitude of attitude jitter.

According to various embodiments yet another spacecraft is provided. The spacecraft comprises a flywheel assembly for reducing the amplitude of attitude jitter in the spacecraft, the flywheel assembly comprising: a controller; a first flywheel; a second flywheel; and a third flywheel, wherein: the first flywheel, second flywheel, and third flywheel are axially aligned and in operable engagement with one another; each of the first, second, and third flywheels is configured to be independently controlled in order to manipulate the phase difference therebetween; and the controller is configured to cause rotation of the first flywheel to increase with respect to rotation of the second flywheel and cause rotation of the third flywheel to decrease with respect to rotation of the second flywheel for a predetermined period of time to reduce the amplitude of attitude jitter.

BRIEF DESCRIPTION OF THE FIGURES

Reference will now be made to the accompanying drawings, which are not necessarily drawn to scale, and wherein.

DETAILED DESCRIPTION OF VARIOUS EMBODIMENTS

Figure 1:
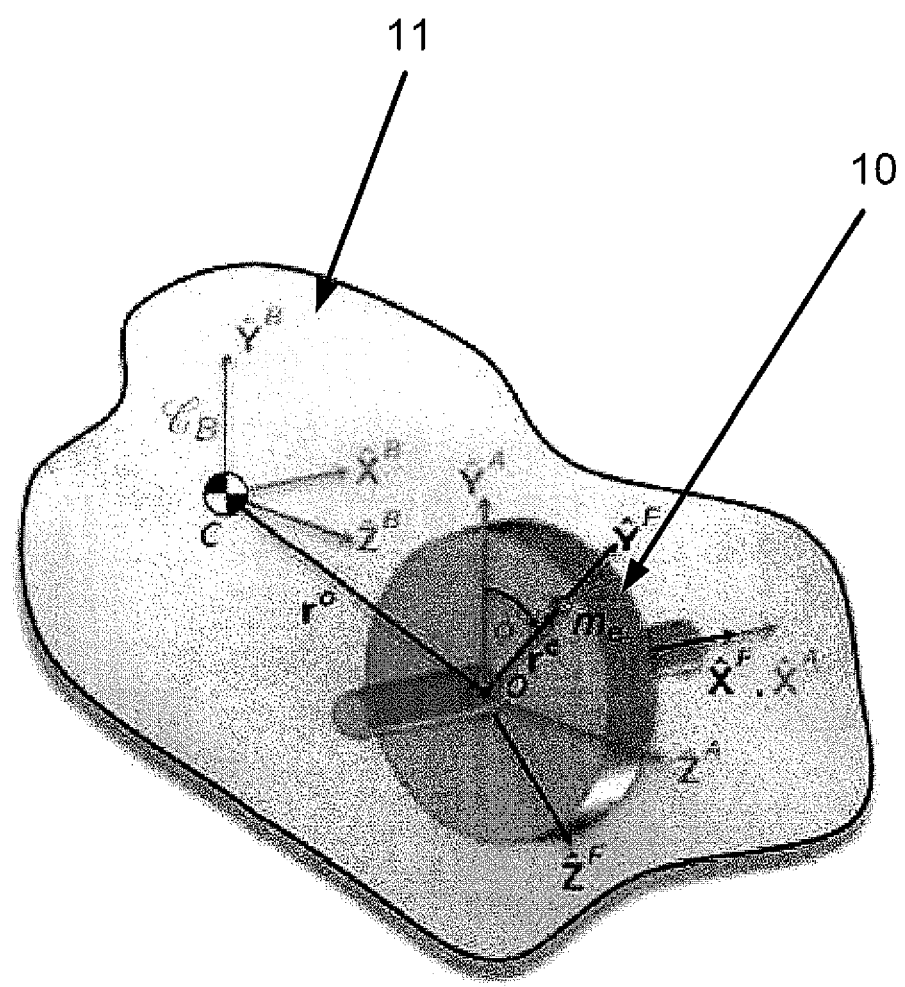
FIG. 1 illustrates a schematic of a conventional single flywheel in a spacecraft.

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Momentum exchange generally comprises a flywheel spinning either at constant angular rate or at varying speeds. However, manufacturing tolerances and material homogeneity oftentimes limit the extent of ideality of these components—for instance, the flywheel center of mass may not coincide with the rotation axis, or in some cases the principal axis may not be parallel to the rotation axis. The former case would result in an imbalance force that imparts a torque to the spacecraft about its center of mass and the latter would impart a pure torque on the spacecraft. Additionally, during the lifetime of these components in orbit, material wear and thermal distortion further deteriorate the balance and symmetry. These disturbances in torques, which may be periodic, result in high frequency oscillations of the spacecraft and some structural elements known as jitter.

Indeed, one of the obvious problems with a flywheel spinning at high speeds is that of imbalance and its effect on the attitude of the satellite. The imbalance introduces a high frequency jitter (equivalent to the angular speed of the flywheel). This drawback is more pronounced in smaller satellites and the task of attitude control of these satellites becomes more challenging; due to their low inertia the satellites are more sensitive to attitude disturbances, be it external (e.g., solar winds) or internal (e.g., due to imbalance in flywheel).

I. Static Imbalance and Dynamic Imbalance in a Flywheel Assembly

As mentioned, jitter may occur due to imbalance in the flywheel assembly. Such imbalance may be, in some cases, due to static imbalance and dynamic imbalance. Static imbalance is the eccentricity in the mass center from the rotation axis, and dynamic imbalance is the absence of a symmetric plane (plane of rotation) normal to the rotation axis.

A description of the notation used throughout the remainder of the description contained herein follows. Specifically, scalars are represented using italicized, lowercase English and Greek alphabets as $$\alpha_{(*)}$$

where the subscript denotes the body which the scalar is associated with. In an analogous fashion, vectors are expressed in a particular coordinate system is given by a column matrix represented by lowercase, upright and boldfaced English or Greek alphabets as given by $$^{(*)}\mathbf{a}^{(*)}_{(*)}$$

where the right superscript and subscript depict the body, and the point associated with the vector, respectively. The left superscript depicts the associated coordinate frame. The basis vectors that represent a coordinate frame are represented using uppercase, italicized, and boldfaced X, Y, or Z letters, with a caret as given by $$\hat{X}^{(*)}, \hat{Y}^{(*)}, \hat{Z}^{(*)}$$

Where the superscript indicates the body associated with the coordinate basis. Inertia matrices are represented by uppercase, upright, and boldfaced English or Greek alphabets as given by $$^{(*)}\mathbf{J}^{(*)}_{(*)}$$

where the right superscript and subscript depict the body, and the point associated with the vector, respectively. The left superscript indicates the body associated with the coordinate basis. The skew matrix of a vector v, which is the matrix equivalent of the vector cross-product is represented as $$[\mathbf{v}]^x = \begin{pmatrix} 0 & -v_z & v_y \\ v_z & 0 & -v_x \\ -v_y & v_x & 0 \end{pmatrix}$$

where $v_x$, $v_y$, $v_z$ are the components of v in a given coordinate basis. Notably, unless otherwise indicated, matrix representations of vectors and dyadics herein are expressed in a coordinate basis of association. For instance, measures of flywheel inertia, mass eccentricity, and flywheel angular velocity are expressed in the flywheel coordinate basis $C_F$, and the spacecraft angular velocity is expressed in the spacecraft body fixed coordinate basis $C_B$.

With reference now to FIG. 1, a spacecraft 11 that comprises at least a rigid spacecraft structure and a flywheel 10 attached thereto is illustrated. The flywheel 10 is assumed to contain some degree of imbalance, and is rigidly secured to the spacecraft using bearings such that it can rotate about an axis fixed in the spacecraft 11. Because focus of the various embodiments herein lies primarily in identifying the source of vibration, and not its transmission through the spacecraft structure, a rigid spacecraft is considered without further description thereof. Further, a single unbalanced flywheel is considered for clarity and to provide better insight into the fundamental effects of an unbalanced flywheel and further, inclusion of multiple flywheels in the analysis does not provide any additional information on the dynamics of jitter.

The unbalanced flywheel 10 is represented by a combination of a homogeneous disc of mass $m_w$, and a small eccentric mass $m_e$. The change in the location of the center of mass (c.m.) C of the spacecraft due to the motion of the eccentric mass results in translational jitter. As stated earlier, only attitude jitter is considered herein and the motion of the c.m. is hence ignored. The c.m. of the homogeneous disc is at a point O which lies on the flywheel rotation axis. The eccentric mass is at a fixed distance $r^e$ relative to O. The angular velocity of the spacecraft, and the angular velocity of the flywheel relative to the spacecraft are represented by $\omega$, and $\Omega$, respectively. A coordinate basis $C_B$ given by the basis $[X^B, Y^B, Z^B]$ is attached to the spacecraft and is referred to as the spacecraft body fixed basis. Another coordinate basis $C_A$ given by $[X^A, Y^A, Z^A]$ is also attached to the spacecraft such that the flywheel rotation axis is along $X^A$. The position of the eccentric mass is represented in a coordinate basis $C_F$ given by $[X^F, Y^F, Z^F]$ which is fixed to the flywheel such that $X^F$ is along the flywheel spin axis, and $Y^F$ is along the projection of $r^e$ in the $Y^F Z^F$ plane. It can therefore observed that $Y^F$ aligns with $Y^A$ when the angle=0. The angle is referred to as the flywheel phase. The direction cosine matrix (DCM) representing the coordinate transformation from $C_F$ to $C_A$ is given by $$R_{AF} = \begin{pmatrix} 1 & 0 & 0 \\ 0 & c\phi & -s\phi \\ 0 & s\phi & c\phi \end{pmatrix} \quad (1)$$

The coordinate transformation from CA to CB is arbitrary and depends on the orientation of the momentum actuator in the spacecraft. This transformation is assumed to be an identity matrix given by $R_{BA}=1$, without loss of generality. The coordinate transformation from CF to CB is therefore given by $R_{BF}=R_{AF}$. The DCM $R_{BF}$ is simply denoted by R.

The total angular momentum of the spacecraft about C, expressed in the spacecraft body coordinate basis $C_B$ is given by $$^B h_c = J_c^s \omega + R(J_o^w \Omega) + m_e[r^o]^x R([\Omega]^x r^e) \quad (2)$$

The inertia matrix of the spacecraft denoted by $J_c^s$, and the inertia matrix of the flywheel system denoted by $J_o^w$ are given as $$J_c^s = I_c^s + R(I_o^w)R^T + m_w((r^o)^T(r^o)1 - (r^o)(r^o)^T) + m_e((r^o + ^B r^e)^T(r^o + ^B r^e)1 - (r^o + ^B r^e)(r^o + ^B r^e)^T) \quad (3a)$$

$$J_o^w = I_o^w + m_e((r^e)^T(r^e)1 - (r^e)(r^e)^T) \quad (3b)$$

where, the inertia of the rigid spacecraft structure about C is represented by $I_c^s$, and the inertia of the homogeneous disc about O is represented by $I_o^w$. In developing the spacecraft attitude equations of motion, we neglect the change in the inertia of the spacecraft due to the displacement of the eccentric mass and also assume zero external torque on the spacecraft.

Thus, using Euler's second law, the spacecraft attitude motion is governed by $$J_c^s \dot{\omega} + [\omega]^{xB} h_c = -R(J_o^F \dot{\Omega}) - m_e[r^o]^x R([\dot{\Omega}]^x r_e) - R([\Omega]^x J_o^F \Omega) - m_e[R(\Omega)]^x[r^o]^x R([\Omega]^x r^e) \quad (4)$$

As may be understood from Equation 4 immediately above, the four terms on the right hand side of the equation contribute to the evolution of the spacecraft states as they continuously redistribute the spacecraft's angular momentum. The first two terms result from flywheel acceleration which may excite certain flexible modes of the spacecraft causing short-term attitude jitter transients. It can also be observed from Equation 4 that this effect can be caused even with a perfectly and/or substantially perfectly balanced flywheel. The focus of this disclosure, however, is the more significant source of jitter viz., flywheel imbalance, which is represented by the third and fourth terms in Equation 4.

First, consider the fourth term in Equation 4, which is a consequence of mass eccentricity. Since the direction of $^B r^e$ changes continually due to flywheel rotation, the angular momentum state of the spacecraft is affected, inducing attitude jitter. This effect vanishes if the eccentricity vector $r^e$ is equal to 0 or if $r^e$ is parallel to the rotation axis (flywheel angular velocity vector). Thus, the effects represented by the fourth term depend only on the component of mass eccentricity normal to $\Omega$ and is referred to as static imbalance. The static imbalance in the flywheel is usually expressed in gmm, and is given by the product $m_e r_e$, where $r_e = (r^e)^T Y^F$. Also note that if the spacecraft center of mass and the eccentric mass are contained in the same plane, then static imbalance results in only translational effects.

Now, consider the third term in Equation 4, which is a consequence of non-symmetric mass distribution in the flywheel. The angular momentum component $J_o^w \Omega$ changes direction in the spacecraft body reference frame at a frequency equal to the flywheel's speed, which imparts an oscillating torque on the spacecraft causing attitude jitter. This effect vanishes if $J_o^w \Omega$ is parallel to the angular velocity vector, i.e., if the principal axis of J'o coincides with the angular velocity vector. The coincidence of the principal axis with the angular velocity vector is dependent on the existence of a plane of mass symmetry normal to the rotation axis. The absence of mass symmetry in the rotor is referred to as dynamic imbalance. The dynamic imbalance is usually expressed in gmm$^2$ and its magnitude is given by the off-diagonal components of J'o associated with the direction of $\Omega$. The net effect on the spacecraft is the sum of jitter due to static and dynamic imbalance.

Notably, the magnitude of jitter induced by the flywheel depends on the amount of imbalance present in the flywheel. Traditionally, flywheels are statically and dynamically balanced on balancing machines using the two-plane balancing method. This method involves calculated addition or removal of small amounts of flywheel mass at multiple locations on two parallel planes fixed to the flywheel. Due to limitations of machines and sensors used in balancing, the flywheels contain some amount of residual imbalance and cannot be perfectly balanced. The beginning-of-life static and dynamic balance achieved by some commercially available momentum actuators are listed in Table 1 below. The actuators are listed in the increasing order of their imbalance values. The last column in Table 1 lists the flywheel balance quality, used to specify the disturbance characteristics of the actuator. Metrics to identify the balancing quality of a flywheel have been standardized.

TABLE 1

BOL Imbalance Data of Commercial Momentum Actuators [14-19]

| Actuator | Static (gmm) | Dynamic (gmm$^2$) | Speed rpm | Quality[1] (approx.) |
|---|---|---|---|---|
| Vectronic VRW-1, (RW) | 1 | 80 | 6500 | <G1 |
| L-3 Comm, RWA-15, (RW) | 3.6 | 920 | 2200 | <G0.4 |
| Honeywell M50, (CMG) | 6 | 1500 | 6500 | <G0.4 |
| Astrium 15-158, (CMG) | 15 | 2000 | 3000 | <G1 |
| Ithaco TW-16B32, (RW) | 15 | 4000 | 5100 | <G2.5 |
| Ithaco TW-50E300, (RW) | 18 | 6000 | 3850 | <G2.5 |

[1]The quality is computed using Eq. 5 and an approximate value of the rotor mass, or alternatively using FIG. A.1

Figure 2:
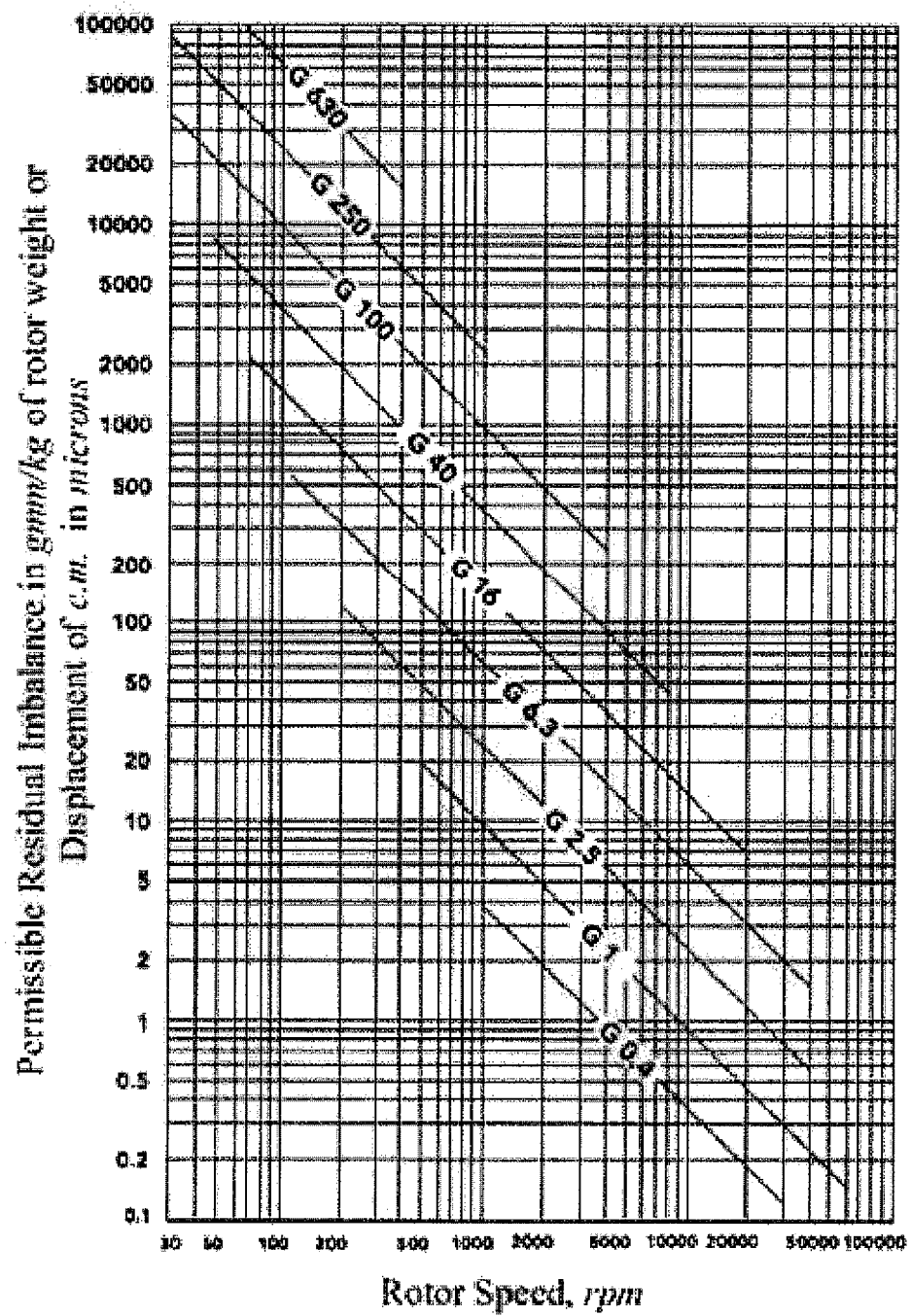
FIG. 2 illustrates an example simulation for a balancing quality as per ISO 1940/1, in accordance with various embodiments of the present invention.

The most commonly used standard is the ISO 1940/1 Balance Quality Requirements for Rigid Rotors, according to which the balancing quality is indicated by the letter G followed by a set of numbers. A higher 'G number' implies a higher imbalance. High-speed and precision rotors such as inertial referencing gyroscopes require a balancing quality of G0.4 (or better), whereas relatively lower precision rotors (e.g., jet engine turbines and magnetic hard disk drives) require a balancing quality of G2.5. The balance quality as per ISO1940/1 for a flywheel of a given mass depends on the residual imbalance (static imbalance) and the angular speed. It hence represents the effect of imbalance, and not just the imbalance. For instance, in Table 1, it may be understood that due to its low speed, the RWA-15 actuator has a better balancing quality even though it has larger imbalance values as compared to the VRW-1 actuator. The total permissible residual imbalance in a rotor can be determined using the ISO 1940/1 balancing quality chart shown in FIG. 2. The chart of FIG. 2 is drawn on a log-log graph. The speed of the flywheel/rotor in rpm is given on the horizontal axis, while the vertical axis represents the permissible residual imbalance in gmm per kg of rotor weight. Alternatively, the vertical axis also represents the displacement of the c.m. of the rotor in mm. For instances, at G0.4, the permissible imbalance for a 2 kg rotor spinning at 2000 rpm is identifiable as 4 gmm. Equivalently, the permissible displacement of the c.m. of such a rotor, so operating, is identifiable as 2 microns.

Alternatively, for a given balancing quality, the permissible residual imbalance can be computed using the relation $$m_e r_e = \frac{9549 \, G \, m_w}{\|\Omega\|} \quad (5)$$

where the imbalance $m_e r_e$ is in gmm, flywheel mass $m_w$ is in kg, and flywheel speed is in rpm.

According to various embodiments, it may be understood from Equation 5 that for the same imbalance value, the balancing quality deteriorates with increase in the flywheel speed. It is therefore difficult to obtain a good balance quality for flywheels spinning at high speeds. This is also reflected in Table 1. It will be shown later, using simulations that even the high balance quality achieved by the actuators as given in Table 1 induce jitter that may be unacceptable for certain missions, and in such cases jitter mitigation methods, as described elsewhere herein, may also need to be employed. Such methods in certain embodiments incorporate a three-flywheel system that produces significantly less jitter when compared to the traditional single-flywheel systems also described elsewhere herein.

II. Exemplary Techniques to Offset Jitter

As noted above, jitter can have a negative effect on spacecraft pointing performance due to flywheel imbalance in momentum devices. Several methods exist to minimize the effect of jitter on spacecraft performance, which methods can generally be classified into direct and indirect methods. Direct methods reduce the magnitude of jitter at the source by making certain modifications to the rotary mechanisms. Direct methods can also be further classified into active and passive methods. Active methods employ isolation mechanisms to actively compensate for jitter. Passive methods make use of damped isolation mounts to secure the jitter causing mechanisms or employ damped oscillators elsewhere in the spacecraft. These mounts function like mechanical low pass filters that attenuate high frequency jitter. More recently, hybrid isolation systems that are a combination of passive and active isolation systems have been used to suppress jitter over a wide range of frequencies. Indirect methods may use post processing techniques along with onboard jitter measurement to refine jitter affected data.

Exemplary techniques in this regard, as compared to various embodiments of the present invention are discussed, in turn, below, in the specific context of spacecraft performance, further noting specific disadvantages thereof, as appropriate. Various direct and indirect methods function by either isolating the source of vibration from the rest of the spacecraft or by isolating the payload alone which is sensitive to vibrations. In some cases, both the payload and the sources of vibration are isolated.

Passive isolators are usually some form of viscoelastic material (e.g., rubber), or specially designed viscous dampers with variable stiffness and damping. These isolators are placed between the vibration source and the payload. The isolator functions as a mechanical low pass filter, absorbing the vibration energy at certain frequencies and thus decreases the magnitude of vibration seen by the payload. They provide reduced transmissibility only beyond the break frequency, and roll off as a second order system at 40 dB/decade. Although a low break frequency may provide isolation at lower frequencies, it reduces the stiffness of the supports. This can in certain instances make the payload vulnerable to large displacements during launch and collision with other spacecraft components. It may also introduce undesirable dynamics (rattle) during attitude control. Passive isolators have been used on many missions, including as a non-limiting example, on the Hubble Space Telescope.

Active isolators include electromechanical actuators such as voice coils, magnetic actuators, and piezo-electric stacks. Multiple such actuators are sometimes used in a hexapod configuration (e.g., Stewart platform) to provide multi degree-of-freedom isolation. The control of these actuators is based on feedback from accelerometers/force sensors mounted at the payload interface. These isolators provide great isolation at low frequencies, but are limited by the bandwidth of the actuators/control systems at higher frequencies. Active isolators require continuous power to isolate, and even support the payload. Thus, active isolators require some sort of a launch lock for restraint during launch. The performance of the active actuators further depends on vibration feedback sensors and control algorithms. The various components of the active isolators also add significant mass to the spacecraft.

Hybrid actuators provide an intermediate approach between active and passive approaches described above, in that they include a combination of active and passive isolators have been implemented to provide a wider bandwidth of isolation, and a steeper roll off. They may also be used to perform limited, but fine pointing of the payload. Hybrid actuators with adaptive damping based on shape memory alloys have also been developed. However, hybrid systems experience challenges encountered in both active and passive systems. Fast steering mirrors that compensate for vibration by dynamically altering the path of the optical beam have been used to compensate for jitter in optical communication, and imaging satellites. Another method that also does not attenuate the vibration, is the use of post-processing techniques to restore jitter affected images [10]. This method, specific to imaging payloads, is not sufficient in itself and is typically used to augment the performance obtained by physical jitter reduction methods such as isolators.

It should be thus understood that, as previously mentioned, the jitter mitigation methods described immediately above operate in efforts to reduce the effect of jitter on the payload, but they do not reduce the jitter produced by the source itself. Thus, need for further improvement exists. Various embodiments of the present invention provide such via a new method to reduce jitter using three flywheels in place of a single flywheel. This method seeks to actively nullify or substantially eliminate the jitter at the source and can be classified as a direct and active method of jitter reduction. Such methods are shown to minimize both static and dynamic imbalance of the flywheel system, thereby reducing the jitter, versus merely addressing the effects of the jitter, as in conventional methods. Additionally, some embodiments also provide for added redundancy to the satellite system, thereby increasing its reliability. In this regard, certain embodiments of the present invention should be understood as being directed to a triple flywheel assembly that adds redundancy for increased reliability and reduces the amplitude of jitter by manipulating the phase difference using controlled balancing techniques.

III. Exemplary Triple Flywheel Assembly Concept

Static and dynamic balancing of flywheels using balancing machines is usually the first step towards achieving favorable jitter performance. Due to uncertainties and imperfections associated with balancing systems and sensors, a perfectly balanced single flywheel is impossible to achieve. The imbalance that remains after balancing is referred to as the residual imbalance. In order to reduce the amount of jitter in a flywheel assembly, some embodiments of the present invention provide two additional similarly balanced flywheels (second and third) to counter the effect of any residual imbalance from the middle (first) flywheel. As noted above, two balancing planes may aid in removal of both static and dynamic imbalance. As such, in some embodiments, two additional flywheels may be used in a similar fashion to perform similar balancing operations for static and dynamic imbalance on the flywheel system during operation.

Various embodiments of the present invention are thus contemplated with the following non-limiting assumptions and/or considerations: (1) multiple flywheels produced in the same batch, made from the same material stock, and balanced using the same machine to the same balancing quality, may have near equal static and dynamic imbalance; (2) the difference in the static and dynamic imbalance between the flywheels thus produced is much smaller than the imbalance of the individual flywheels; (3) jitter caused by flywheel imbalance is greater than that caused by bearing race imperfections; (4) structural deflections due to high speed rotation (hoop strain) and thermal gradients is uniform across all flywheels; and (5) a certain degree of redundancy may be desired in a spacecraft subsystem for robustness against component failure.

Figure 3:
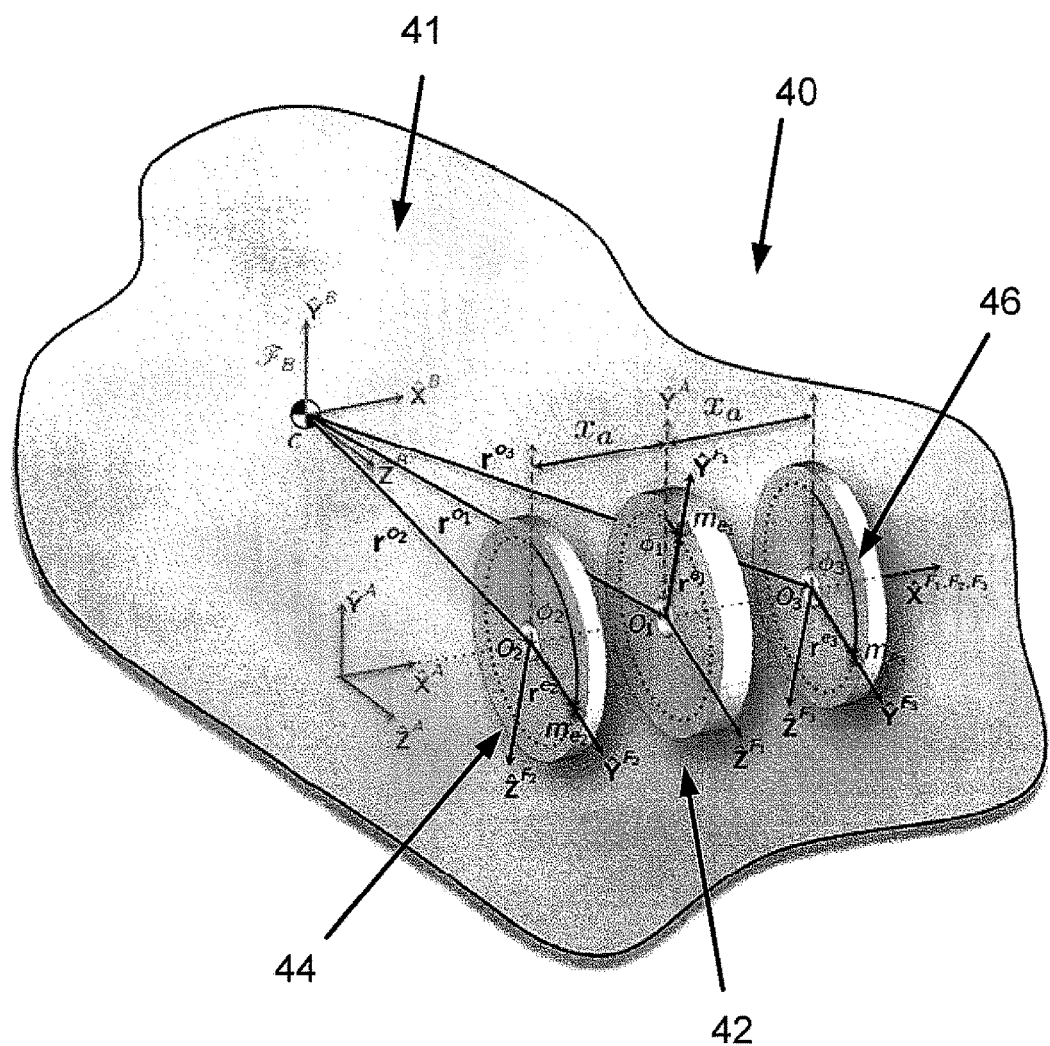
FIG. 3 illustrates a schematic of an example three-flywheel system in a spacecraft, according to one embodiment of the present invention.

According to various embodiments, with reference now to FIG. 3, a three-flywheel system 40 is illustrated, which comprises three flywheels 42, 44, 46—as may be substituted for a single flywheel (e.g., shown in FIG. 1). In certain embodiments, the total mass of the three-flywheel system 40—including flywheels 42, 44, and 46—is equal to and/or substantially the same as the mass of the single flywheel. The flywheels 42, 44, 46 are illustrated separately in the schematic of FIG. 3, which has been done intentionally for clarity. However, in some embodiments, the three flywheels 42, 44, 46 may be integrated compactly to function together in a volume approximately equal to that occupied by a single-flywheel system, however as may be desirable for certain applications Similar to the single-flywheel configuration described elsewhere herein with reference to FIG. 1, the c.m. of the spacecraft 41 incorporating the three flywheel system 40 is denoted by C, and the spacecraft body coordinate basis $C_B$ is given by $[X^B, Y^B, Z^B]$. In at least certain embodiments, the c.m. of the spacecraft 41 is unaffected and/or otherwise unchanged as between use of the single-flywheel versus the three-flywheel configuration. In other embodiments, however, the c.m. may be at least in part impacted or otherwise changed via incorporation of the three-flywheel system 40.

Remaining with FIG. 3, it may be understood that, according to various embodiments, the three flywheels are denoted by 42, 44, and 46, and each flywheel is represented as a composition of a homogeneous disc and a small eccentric point mass as in the previous case of the single-flywheel system. In certain embodiments, the disc of flywheel 42 has twice the mass, and axial inertia compared to discs of flywheels 44, and 46. The mass of the homogeneous discs associated with flywheels 42, 44 and 46 are denoted by $m_{w1}$, $m_{w2}$, and $m_{w3}$, respectively. The center of mass of the homogeneous discs represented by $O_1$, $O_2$, and $O_3$ are at distances $r^{o1}$, $r^{o2}$, and $r^{o3}$, respectively from C. The eccentric mass of the flywheels 42, 44 and 46 are denoted by $m_{e1}$, $m_{e2}$, and $m_{e3}$, respectively. The position of the eccentric masses $m_{e1}$, $m_{e2}$, and $m_{e3}$ relative $O_1$, $O_2$, and $O_3$, are given by $r^{e1}$, $r^{e2}$, and $r^{e3}$, respectively.

Since all three flywheels are balanced to the same quality according to various embodiments, and for a given speed of the flywheel, the balance quality represents the displacement of the c.m., the relationship between the eccentricity parameters of the flywheels are given by Equations (6a)-(6d) below:

$$\hat{r}_s r^{es} = r_{e_i}[1\ 1\ 1]^T \quad i = 1, 2, 3 \tag{6a}$$

$$r_{e_i} = (r^{es})^T \hat{Y}^{F_i} \tag{6b}$$

$$r_{e_1} = r_{e_2} = r_{e_3} = r_e \tag{6c}$$

$$\frac{m_{e_1}}{2} = m_{e_2} = m_{e_3} = m_e \tag{6d}$$

According to various embodiments, the direction of the eccentricity vectors corresponding to the three flywheels is arbitrary, but identical. With continued reference to FIG. 3, a coordinate basis $C_A$ given by $[X^A, Y^A, Z^A]$ is attached to the spacecraft such that $X^A$ defines the spin axes of the flywheels. A coordinate basis $C_{F1}$ given by $[X^{F1}, Y^{F1}, Z^{F1}]$ is attached to the flywheel 42 such that $X^{F1}$ is along $X^A$ and $Y^{F1}$ is along the projection of $r^{e1}$ on the $[X^{F2}, Y^{F2}, Z^{F2}]$ plane. The angle between $Y^{F1}$ and $Y^A$ about $X^A$ is given by $\varphi_1$. The coordinate basis $C_{F2}$ given by $[X^{F2}, Y^{F2}, Z^{F2}]$, and $C_{F3}$ given by $[X^{F3}\ Y^{F3}, Z^{F3}]$ associated with flywheels 44 and 46, respectively are defined similarly.

The flywheels 44 and 46 are axially separated from flywheel 42 by $x_a$ as shown in FIG. 3, as may be desirable for certain embodiments. In such embodiments, the position vectors $r^{o2}$ and ro3 are therefore given by Equation 7, below:

$$r^{o2} = r^{o1} - x_a \hat{X}^A$$

$$r^{o3} = r^{o1} - x_a \hat{X}^A \tag{7}$$

The coordinate transformation from the $i^{th}$ flywheel coordinate basis $C_{Fi}$ to $C_A$ is given by a DCM identical to Equation 1 but with $\varphi$ replaced by $\varphi_i$. The angle $\varphi_i$ is the phase of the $i^{th}$ flywheel. The coordinate transformation from $C_{Fi}$ to $C_B$ is therefore given by $$R_{BF_i} = R_{BA} R_{AF_i} \tag{8}$$

where $R_{BA}$ is any arbitrary DCM. The DCM $R_{BFi}$ is simply denoted by $R_i$ for brevity. The coordinate transformations associated with flywheels 44 and 46 are similarly defined. The angular velocities of the flywheels 42, 44, and 46 relative to the spacecraft according to various embodiments are denoted by $\Omega^1$, $\Omega^2$, and $\Omega^3$, respectively. Consider the case wherein the phase and angular velocity relations between the flywheels are given by $$\phi_2 = \phi_3 = (\phi_1 \pm \pi) \tag{9}$$

$$\|\Omega^1\| = \|\Omega^2\| = \|\Omega^3\| = \Omega \tag{10}$$

It will be now be shown that, when the three-flywheel system in FIG. 3 and according to various embodiments disclosed herein satisfies Equations (6a) through Equation 10, the system achieves both static and dynamic balance. In these and still other embodiments, the angular momentum of a rigid spacecraft with a three-flywheel system expressed in the spacecraft body coordinate basis $C_B$ is given by $$^B h_c = J_c^s \omega + \sum_{i=1}^{3} R_i(J_{o_i}^{F_i} \Omega^i) + m_{e_i}[r^{o_i}]^x R_i([\Omega^i]^x r^{e_i}) \quad (11)$$

where, the spacecraft inertia matrix $J_c^s$ is given by $$J_c^s = I_c^s + \sum_{i=1}^{3} R_i(I_o^{F_c})R_i^T + m_{w_i}((r^{o_s})^T(r^{o_i})1 - (r^{o_i})(r^{o_i})^T + \\ m_{e_i}((r^{o_i} + {}^B r^{e_i})^T(r^{o_i} + {}^B r^{e_i})1 - (r^{o_i} + {}^B r^{e_i})(r^{o_i} + {}^B r^{e_i})^T) \quad (12)$$

and the flywheel inertia matrix is given by $$J_{o_i}^{F_i} = I_{o_i}^{F_i} + m_{e_i}((r^{e_i})^T(r^{e_i})1 - (r^{e_i})(r^{e_i})^T) \quad (13)$$

In the above expressions, $I_c^s$ is the inertia of the spacecraft structure about C, and $I_o^{F_i}$ is the inertia of the homogeneous disc associated with the $i^{th}$ flywheel about $O_i$. The inertia matrix $I_o^{F_i}$ can be expressed in the coordinate basis $C_{Fi}$ as $$^{F_i}I_{o_i}^{F_i} = \text{diag}(I_{ai}, I_{ti}, I_{ti}) \quad (14)$$

where the terms $I_{ai}$ and $I^{ti}$ represent respectively, the axial and transverse inertia of the homogeneous disc. Further, since the axial inertia of the homogeneous disc of flywheel 42 was assumed or otherwise considered, in accordance with various embodiments described herein, to be twice that of the discs associated with flywheels 44 and 46, it follows that $$0.5 I_{a1} = I_{a2} = I_{a3} = I_a \quad (15)$$

Using Equations. 6a, 8, and 14, the angular momentum in Equation 11 may thus be rewritten as $$^B h_c = J_c^s \omega + \sum_{i=1}^{3} \begin{pmatrix} (I_{ai} + 2m_{ei}r_{ei}^2)\Omega_i \\ (s\phi_i - c\phi_i)(m_{ei}r_{ei}^2)\Omega_i \\ -(c\phi_i + s\phi_i)(m_{ei}r_{ei}^2)\Omega_i \end{pmatrix} + \\ [r^{o_i}]^x \begin{pmatrix} 0 \\ -(c\phi_i + s\phi_i)(m_{ei}r_{ei})\Omega_i \\ (c\phi_i - s\phi_i)(m_{ei}r_{ei})\Omega_i \end{pmatrix} \quad (16)$$

where $\Omega_i = \|\Omega_i\|$, and the arbitrary DCM $R_{BA}$ is assumed to be the identity matrix 1. It can be inferred from Equation 16 that with arbitrary values for each of $\varphi_i$, $r_{ei}$, $m_{ei}$, and $\Omega_i$ the system is both statically and dynamically unbalanced. Furthermore, the assumptions and/or considerations of Equations 6c, 6d, 10, and 15 yield $$^B h_c = J_c^s \omega + \begin{pmatrix} 4(I_a + 2m_e r_e^2)\Omega \\ m_e r_e^2(2s\phi_1 + s\phi_2 + s\phi_3 - 2c\phi_1 - c\phi_2 - c\phi_3)\Omega \\ -m_e r_e^2(2c\phi_1 + c\phi_2 + c\phi_3 + 2s\phi_1 + s\phi_2 + s\phi_3)\Omega \end{pmatrix} + \\ [r^{o_i}]^x \begin{pmatrix} 0 \\ -m_e r_e(2c\phi_1 + c\phi_2 + c\phi_3 + 2s\phi_1 + s\phi_2 + s\phi_3)\Omega \\ m_e r_e(2c\phi_1 + c\phi_2 + c\phi_3 - 2s\phi_1 - s\phi_2 - s\phi_3)\Omega \end{pmatrix} \quad (17)$$

On observation of Equation 17, it may be seen and understood that the static and dynamic imbalance of the system depend on the phase angles $\varphi_i$. Further, the maximum imbalance occurs according to various embodiments when the phases are equal, which is a condition analogous to the single-flywheel system. On the other hand, when relation between the flywheel phases $\varphi_i$ is given by Equation 9, complete static and dynamic balance is achieved, and the angular momentum of the spacecraft can therefore be written as $$h_c = J_c^s \omega + 4\Omega(I_a + 2m_e r_e^2)\hat{x}^A \quad (18)$$

Assuming zero external torque on the spacecraft according to various embodiments, the rate change of angular momentum is given by $$\dot{h}_c = J_c^s \dot{\omega} + [\omega]^x h_c = 0 \quad (19)$$

Equation 19 represents the attitude equations of motion of a completely balanced system according to various embodiments that is substantially devoid of any jitter. Thus, in certain embodiments, complete static and dynamic balance can be achieved using the three-flywheel system that satisfies the conditions given by Equations 6c, 6d, 10, and 15. The equations of motion of a generic three-flywheel system that may not perfectly and/or substantially satisfy these assumptions and/or considerations is given by $$J_c^s \dot{\omega} + [\omega]^x {}^B h_c + \sum_{i=1}^{3} R_i(J_{a_i}^{F_i} \dot{\Omega}^i) + m_{e_i}[r^{o_i}]^x R_i([\dot{\Omega}^i]^x r^{e_i}) + \\ \sum_{i=1}^{3} R_i[\Omega^i]^x J_{a_i}^{F_i} \Omega^i + m_{e_i}[R_i \Omega^i]^x [r^{o_i}]^x R_i[\Omega^i]^x r^{e_i} = 0 \quad (20)$$

and is used to perform numerical simulations described elsewhere herein.

The discussion herein and the simulations that follow consider a fixed nominal speed for the flywheel (typical of a CMG) to maintain the desired phase relations. In case of an actuator like a reaction wheel, where the flywheel acceleration is the source of actuator torque output, all three flywheels are accelerated (controlled) in unison. This ensures according to various embodiments that the flywheels do not change their relative phase difference.

IV. EXEMPLARY TRIPLE FLYWHEEL ASSEMBLY CONCEPT VERIFICATION AND SIMULATION

Detailed simulations that portray the capability of the three-flywheel system according to various embodiments are described, in turn, below. The results of the simulations and some practical implications like flywheel failure, and power and mass characteristics of the three-flywheel system are also discussed.

First, simulations of the single-flywheel system according to various embodiments and illustrated in FIG. 1 are performed to obtain benchmark jitter values. Next, a baseline three-flywheel system given by Equation 17 is simulated to show that under ideal conditions, the three-flywheel system achieves complete static and dynamic balance. This is followed by a set of high-fidelity simulations performed for flywheels with various balancing qualities, and non-ideal conditions. The effect of single/multiple flywheel failures is then investigated with another set of simulations. A discussion on the power and mass characteristics of the three-flywheel system is provided thereafter. Finally, a comment on the measurement of flywheel phase is made.

It should be understood, however, that these simulations and discussions are exemplary and non-limiting and applicable to any of the various embodiments described herein, although in certain instances only certain or a single embodiment may be referenced.

A. An Exemplary Single-Flywheel System

An exemplary single-flywheel system according to various embodiments may be simulated by numerically integrating Equation 4 to obtain a trajectory for the spacecraft angular velocity. The simulation parameters are given in Table 2, which is provided below.

TABLE 2

Single-Flywheel System Simulation Parameters

| Parameter | Value | Units |
|---|---|---|
| Solver | 4th order Runge-Kutta | n/a |
| Time step | 0.0001 (fixed) | s |
| Spacecraft mass | m = 10 | kg |
| Spacecraft inertia | $J_c^s = \begin{bmatrix} 0.1586 & -0.0030 & -0.0015 \\ -0.0030 & 0.1586 & -0.0015 \\ -0.0015 & -0.0015 & 0.1609 \end{bmatrix}$ | kgm² |
| Flywheel inertia | $J_o^w = \begin{bmatrix} 600.0054 & -0.0027 & -0.0027 \\ -0.0027 & 342.2554 & -0.0027 \\ -0.0027 & -0.0027 & 342.2554 \end{bmatrix} 10^{-7}$ | kgm² |
| Flywheel Mass | $m_w = 0.3$ | kg |
| Position of flywheel center | $^B r^o = [0.1 \ 0.1 \ 0.05]^T$ | m |
| Flywheel eccentric mass | $m_e = 0.27 \times 10^{-3}$ | kg |
| Eccentricity | $^F r^e = [1 \ 1 \ 1]^T 10^{-3}$ | m |
| Static imbalance | 0.27 | gmm |
| Dynamic Imbalance | 0.27 | gmm² |
| Flywheel speed | $^F \Omega = [10000 \ 0 \ 0]^T$ | rpm |
| Spacecraft initial angular velocity | $^B \omega(0) = [0 \ 0 \ 0]^T$ | rad/s |

The spacecraft and flywheel inertias are computed using Equation 3a and Equation 3b, respectively. The eccentric mass, and its position are chosen so as to obtain a balancing quality of G1, which is also the average quality of the actuators listed in Table 1. However, it should be noted that the dynamic imbalance value used for the simulations is superior (well balanced) to those of the actuators in Table 1, provided elsewhere herein.

Figure 4:
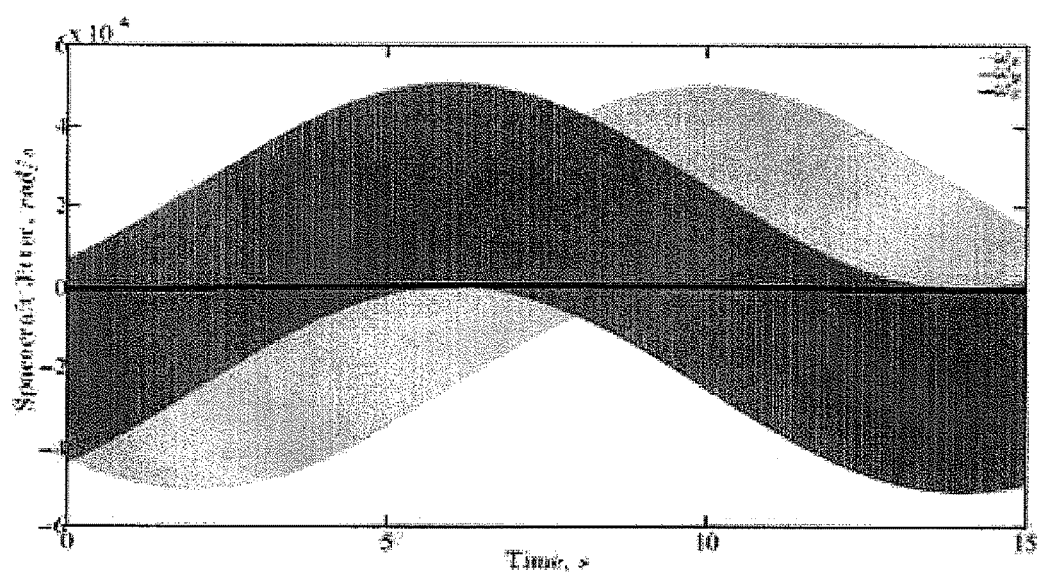
FIGS. 4-5 illustrate example simulations for the single flywheel system shown in FIG. 1, according to various embodiments of the present invention.
Figure 4:
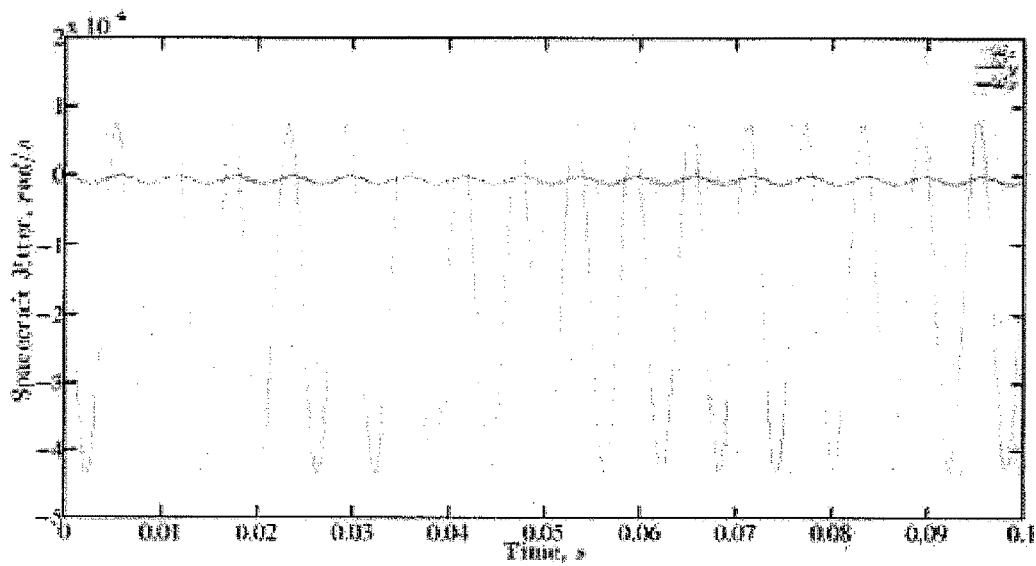

The angular velocity of the spacecraft according to various embodiments and as obtained from the simulations is also shown in FIG. 4. The angular velocity comprises two components, viz. high frequency jitter and low frequency precession. The jitter is due to the unbalanced flywheel as discussed earlier, and the precession is due to the gyroscopic coupling between the spacecraft angular velocity and the flywheel angular momentum. The angular velocity in FIG. 4(a) is plotted for 15 seconds to show one full cycle of precession, beyond which the trajectory repeats itself since there is no damping or energy dissipation in the system.

Figure 5:
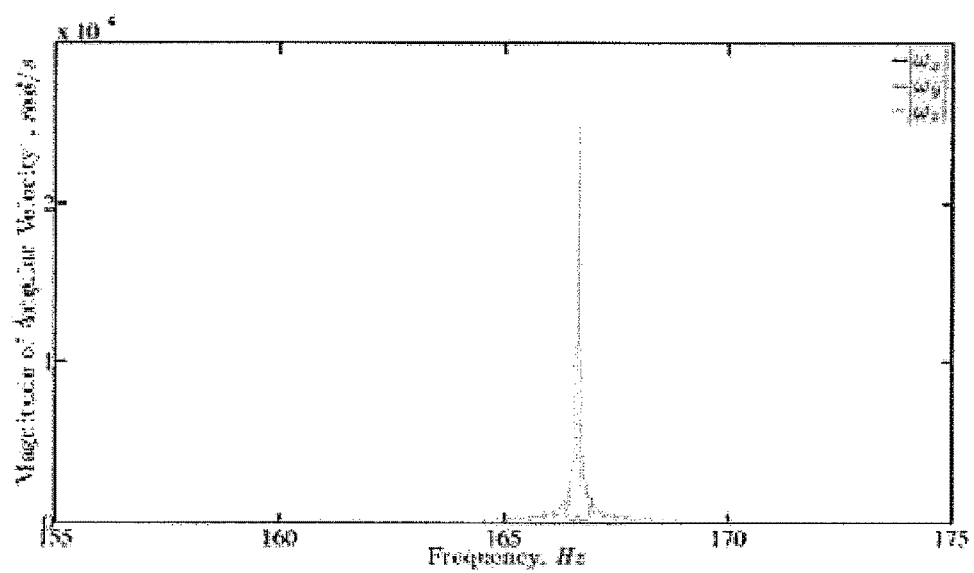

The high frequency jitter is also evident in FIG. 4(b) in which the angular velocity trajectory is plotted for only 0.1 seconds to show a zoomed view. A fast Fourier transform (FFT) of the angular velocity is shown in FIG. 5, and it may be understood that jitter frequency is equal to the flywheel rotation speed as expected. The magnitude of jitter as seen in FIG. 4(b) is about 5×10⁻⁴ rad/s which corresponds to an angular jitter of 0.19 arc-sec. This value of jitter may meet the requirements of certain low-accuracy missions, while it is unacceptable in some. For instance, the Hubble space telescope has an attitude stability requirement of 0.007 arc-sec.

B. An Exemplary Ideal System

An exemplary ideal or baseline simulation that demonstrates the three-flywheel system according to various embodiments is described below. The system parameters are chosen such that the conditions given by equations 6c, 6d, 10, and 15 are exactly satisfied. The simulation parameters are given in Table 3, which is reproduced below.

TABLE 3

Ideal Three-Flywheel System Simulation Parameters

| Parameter | Value | Units |
|---|---|---|
| Solver | 4th order Runge-Kutta | n/a |
| Time step | 0.0001 (fixed) | s |
| Spacecraft mass | m = 10 | kg |
| Spacecraft inertia | $J_c^s = \begin{bmatrix} 0.1586 & -0.0030 & -0.0015 \\ -0.0030 & 0.1586 & -0.0015 \\ -0.0015 & -0.0015 & 0.1609 \end{bmatrix}$ | kgm² |
| Inertia of Flywheel $F_1$ | $J_{o_1}^{F_1} = \begin{bmatrix} 300.0027 & -0.0014 & -0.0014 \\ -0.0014 & 155.2839 & -0.0014 \\ -0.0014 & -0.0014 & 155.2839 \end{bmatrix} 10^{-7}$ | kgm² |
| Inertia of Flywheel $F_2$ and $F_3$ | $J_o^{F_2} = J_o^{F_3} = \begin{bmatrix} 150.0014 & -0.0007 & -0.0007 \\ -0.0007 & 75.6615 & -0.0007 \\ -0.0007 & -0.0007 & 75.6615 \end{bmatrix} 10^{-7}$ | kgm² |
| Mass of flywheel discs | $m_{w_1} = 0.15, m_{w_2} = m_{w_3} = 0.075$ | kg |
| Position of point $O_1$ | $^B r^{o_1} = [0.1 \ 0.1 \ 0.05]^T$ | m |
| Position of point $O_2$ | $^B r^{o_2} = [0.09425 \ 0.1 \ 0.05]^T$ | m |
| Position of point $O_3$ | $^B r^{o_3} = [0.10575 \ 0.1 \ 0.05]^T$ | m |
| Flywheel eccentric masses | $m{e_1} = 0.135 \times 10^{-3}, m{e_2} = m{e_3} = 0.0675 \times 10^{-3}$ | kg |
| Flywheel mass eccentricities | $^{F_1} r^{e_1} = {}^{F_2} r^{e_2} = {}^{F_3} r^{e_3} = 10^{-3}[1 \ 1 \ 1]^T$ | m |

TABLE 3-continued

Ideal Three-Flywheel System Simulation Parameters

| Parameter | Value | Units |
|---|---|---|
| Maximum static imbalance | 0.27 | gmm |
| Maximum dynamic Imbalance | 0.27 | gmm2 |
| Flywheel speeds | $\|\Omega^1\| = \|\Omega^2\| = \|\Omega^3\| = 10000$ | rpm |
| Spacecraft initial angular velocity | $^B\omega(0) = [0 \quad 0 \quad 0]^T$ | rad/s |

The simulation is performed by numerically integrating Equation 20 (elsewhere herein), and begins with all flywheels in phase with respect to each other, i.e., $\varphi_1=\varphi_2=\varphi_3=0$, and spinning at constant and equal angular velocities. These phase and angular velocity conditions result in a dynamic system equivalent to the single-flywheel system represented by Equation 4, as the spacecraft and flywheel mass properties of both systems are identical in this configuration.

Continuing with the simulation, at 10 seconds, flywheel 42 is commanded a trapezoidal angular velocity profile (additive to the constant angular velocity) lasting 4.5 seconds such that it gains it radians over the phase of flywheel 42, $\varphi 1$. Flywheel 46 is also commanded the same angular velocity profile but opposite in direction. Flywheel 46 will therefore lag flywheel 42 by a certain degree or radians, but will be in phase with flywheel 44. Thus, according to various embodiments, the equal and opposite motion of the flywheels 44 and 46 do not result in any net acceleration on the spacecraft.

Figure 6:
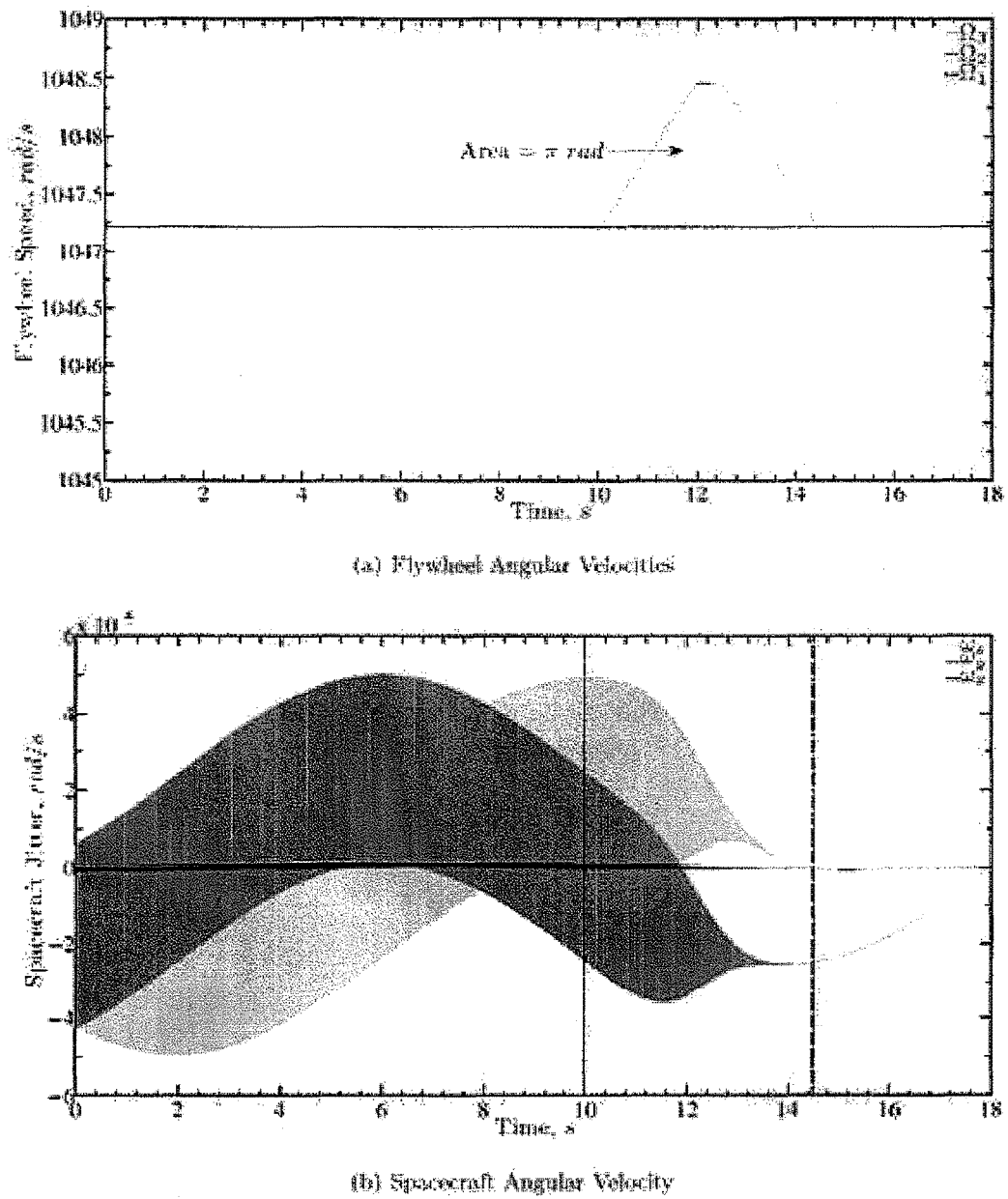
FIGS. 6-8 illustrate example simulations for the three flywheel system shown in FIG. 3, according to various embodiments of the present invention.

Turning now to FIGS. 6(a)-(b), it may be understood that the relative phase alignment as given by Equation 9 is achieved at the end of the 14.5 seconds, and completely balances the three-flywheel system. The system dynamics is now represented by Equation 19 which is free from jitter. Since the angular velocities of the flywheels are equal, the relative alignment between the flywheels remains unchanged and thus maintains the desired phase relations. FIG. 6(a) in particular shows the commanded flywheel angular velocity profiles. The angular velocity commands of flywheels 44 and 46 that shift the relative phase between the flywheels by it radians can be seen between 10 and 14.5 seconds.

FIG. 6(b) shows the spacecraft angular velocity. It may be understood therefrom that, until 10 seconds into the simulation, the level of jitter corresponds exactly to the single-flywheel case shown in FIG. 1 as the imbalances in both systems are identical. As the phase between the flywheels is gradually changed between 10 seconds and 14.5 seconds, the high frequency jitter is completely removed from the system. The residual motion of the spacecraft according to various embodiments is thus due to the coupling between the spacecraft angular velocity and the angular momentum of the three-flywheel system.

C. Exemplary High-Fidelity Simulations

The ability of an ideal three-flywheel system according to various embodiments to achieve complete static and dynamic balance was demonstrated in the previous simulation. The ideal system is based on the exactness of the eccentricity and angular velocity conditions given by Equations 6c, 6d, 10, and 15. Since manufacturing equipment and methods, material homogeneity, sensors, bearings, and control systems have associated errors, these conditions are not perfectly valid and include some uncertainty. We now consider a three-flywheel system with variations in eccentricity and angular velocity conditions induced by these uncertainties, as will be inherently present according to various embodiments. These high-fidelity conditions comprise at least: (1) the difference in static imbalance between flywheels is within ±2.5% of the given balancing quality; (2) the difference in dynamic imbalance between flywheels is within ±2.5% of the given balancing quality; (3) the deviation in the axial separation $x_a$ between one set and flywheels and the other is less than 20 µm; (4) flywheel phase control inaccuracies result in deviations of the desired phase relations by ±10° (The inaccuracy considered is more than that of a commercial product); and (5) variation in flywheel accelerations between the three flywheels resulting from independent phase/speed control is considered.

The equations of motion of a generic three-flywheel system represented by Equation 20 are simulated to show that the use of a realistic three-flywheel system results in significant jitter reduction compared to a single-flywheel system. It was mentioned that the three-flywheel system does not require precision balancing of the individual flywheels as long as all the flywheels are balanced to the same quality. Simulations are performed for four different balancing qualities (G0.4, G1, G2.5, and G6.3) to verify the same. The parameters common to all of these simulations are listed in Table 4, provided below.

TABLE 4

Three-Flywheel System Common Simulation Parameters (High Fidelity)

| Parameter | Value | Units |
|---|---|---|
| Solver | 4th order Runge-Kutta | n/a |
| Time step | 0.0001 (fixed) | s |
| Spacecraft mass | m = 10 | kg |
| Spacecraft inertia | $J_c^s = \begin{bmatrix} 0.1586 & -0.0030 & -0.0015 \\ -0.0030 & 0.1586 & -0.0015 \\ -0.0015 & -0.0015 & 0.1609 \end{bmatrix}$ | kgm² |
| Mass of flywheel discs | $m_{w_1} = 0.15, m_{w_2} = m_{w_3} = 0.075$ | kg |
| Axial separation between $F_1$ and $F_2$ | $x_a = 5.75 \times 10^{-3}$ | m |
| Axial separation between $F_1$ and $F_3$ | $x_a = 5.73 \times 10^{-3}$ | m |
| Position of point $O_1$ | $^Br^{o1} = [0.1 \quad 0.1 \quad 0.05]^T$ | m |
| Position of point $O_2$ | $^Br^{o2} = [0.09425 \quad 0.1 \quad 0.05]^T$ | m |
| Position of point $O_3$ | $^Br^{o3} = [0.10575 \quad 0.1 \quad 0.05]^T$ | m |
| Flywheel speeds | $\|\Omega^1\| = \|\Omega^2\| = \|\Omega^3\| = 10000 \pm 0.5$ | rpm |
| Peak difference between flywheel phases | $\varphi_i - \varphi_j = \pm 10$ | deg |
| Spacecraft initial angular velocity | $^B\omega(0) = [0 \quad 0 \quad 0]^T$ | rad/s |

Figure 7:
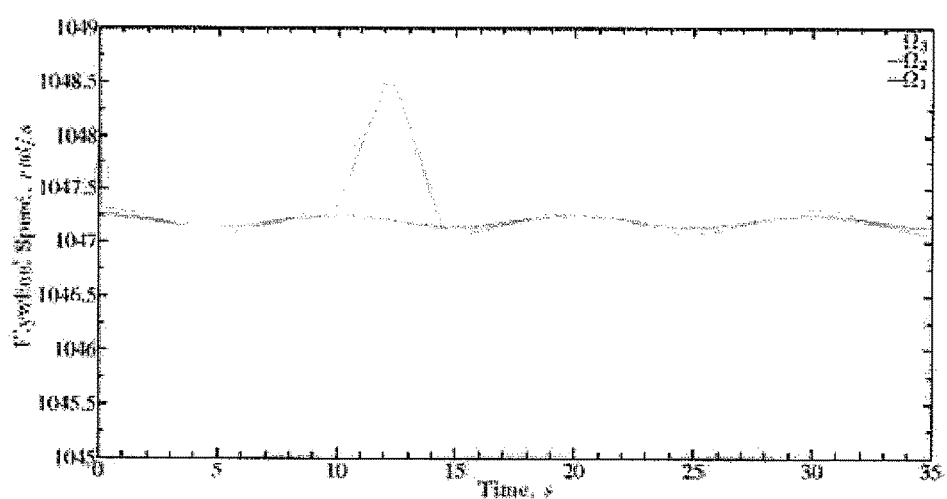

With reference also to FIG. 7, the flywheel angular velocity profiles that produce a sinusoidal variation of ±10° between the flywheel phases may be seen and understood. This velocity profile is also common to all the simulations.

Figure 8:
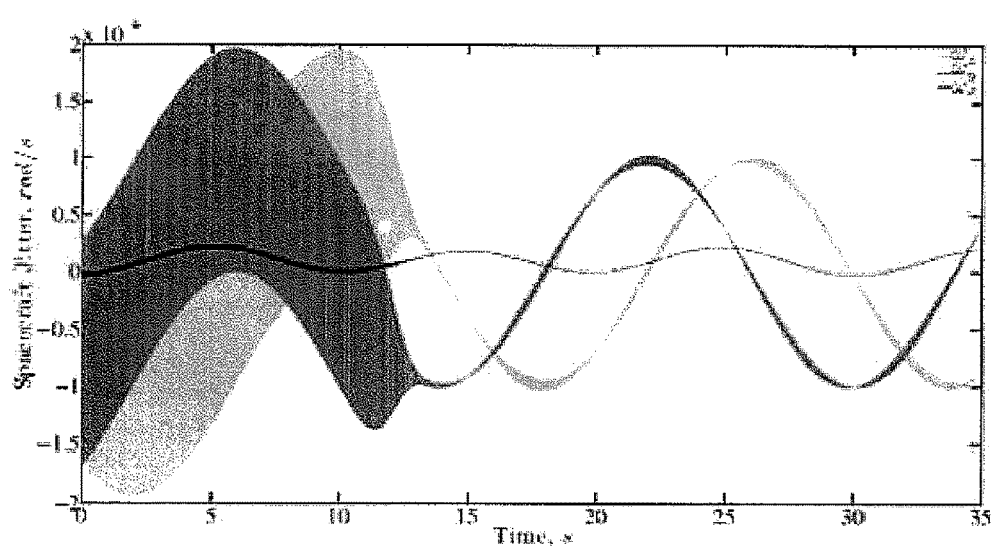

The simulation parameters and results of a three-flywheel system whose individual flywheels are balanced to a G0.4 quality are shown in Table 5 (provided below) and FIG. 8, respectively. The mass eccentricity parameters are chosen to achieve this balance quality.

TABLE 5

G0.4 Three-Flywheel System Simulation Parameters (High Fidelity)

| Parameter | Value | Units |
|---|---|---|
| Flywheel $F_1$ eccentric masses | $me_1 = 0.0525 \times 10^{-3}$ | kg |
| Flywheel $F_2$ eccentric masses | $me_2 = 0.0269 \times 10^{-3}$ | kg |
| Flywheel $F_3$ eccentric masses | $me_3 = 0.0256 \times 10^{-3}$ | kg |
| Flywheel mass eccentricities | $^{F_1}r^{e_1} = {}^{F_2}r^{e_2} = {}^{F_3}r^{e_3} = 10^{-3}[1\ 1\ 1]^T$ | m |
| Inertia of Flywheel $F_1$ | $J_{o1}^{F_1} = \begin{bmatrix} 300.0011 & -0.0005 & -0.0005 \\ -0.0005 & 155.2823 & -0.0005 \\ -0.0005 & -0.0005 & 155.2823 \end{bmatrix} 10^{-7}$ | $kgm^2$ |
| Inertia of Flywheel $F_2$ | $J_{o2}^{F_2} = \begin{bmatrix} 150.0005 & -0.0003 & -0.0003 \\ -0.0003 & 75.6607 & -0.0003 \\ -0.0003 & -0.0003 & 75.6607 \end{bmatrix} 10^{-7}$ | $kgm^2$ |
| Inertia of Flywheel $F_3$ | $J_{o3}^{F_3} = \begin{bmatrix} 150.0005 & -0.0003 & -0.0003 \\ -0.0003 & 75.6607 & -0.0003 \\ -0.0003 & -0.0003 & 75.6607 \end{bmatrix} 10^{-7}$ | $kgm^2$ |
| Maximum static imbalance | 0.105 | gmm |
| Maximum dynamic Imbalance | 0.11 | $gmm^2$ |

Figure 9:
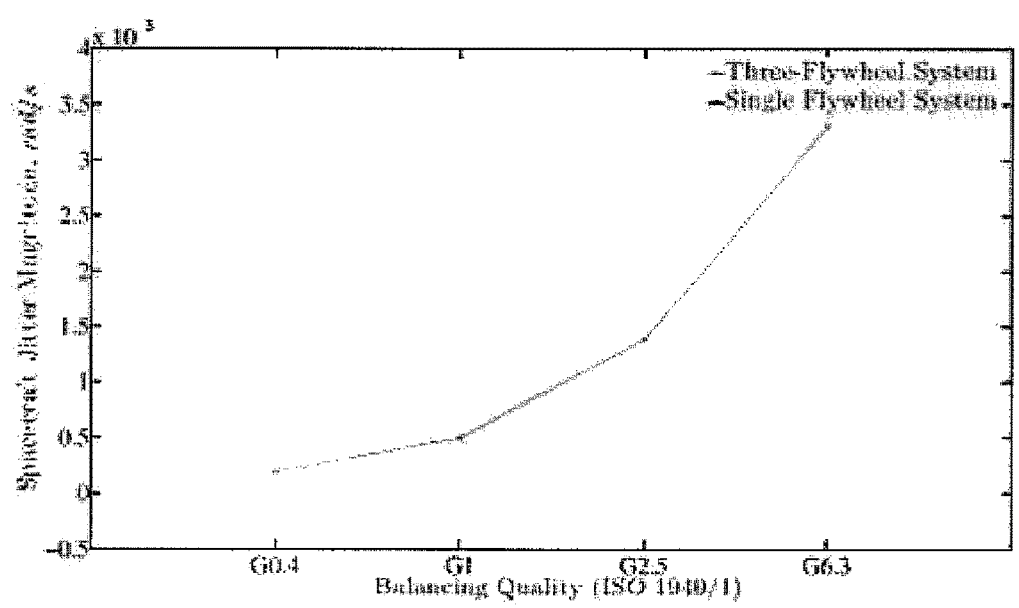
FIG. 9 illustrates a comparison of jitter measured in the single flywheel system and the three flywheel system, according to various embodiments of the present invention.

The results of the simulations performed for all balancing qualities are summarized in FIG. 9 which shows the residual jitter (magnitude of spacecraft angular velocity) of the three-flywheel system and the corresponding jitter of the single flywheel system. It can be understood from FIG. 9 that even with a balancing quality of G6.3, the three-flywheel system produces less jitter than a single-flywheel system with a G0.4 balancing quality.

Still further, generally speaking, there is a marginal increase in the residual jitter magnitude of the three-flywheel system according to various embodiments with decrease in the balancing quality. This is caused by the ±10° deviation in the phase angles, which amplify the effect of the imbalance present in the flywheels. In an ideal three-flywheel system, the residual jitter is always zero regardless of the balancing quality. It can be inferred from the simulation results, that the three-flywheel system according to various embodiments described herein produces a maximum residual jitter that is at least 20 times lower compared to that produced by a similarly balanced single-flywheel system.

D. Exemplary Effects of Flywheel Failure

Figure 17:
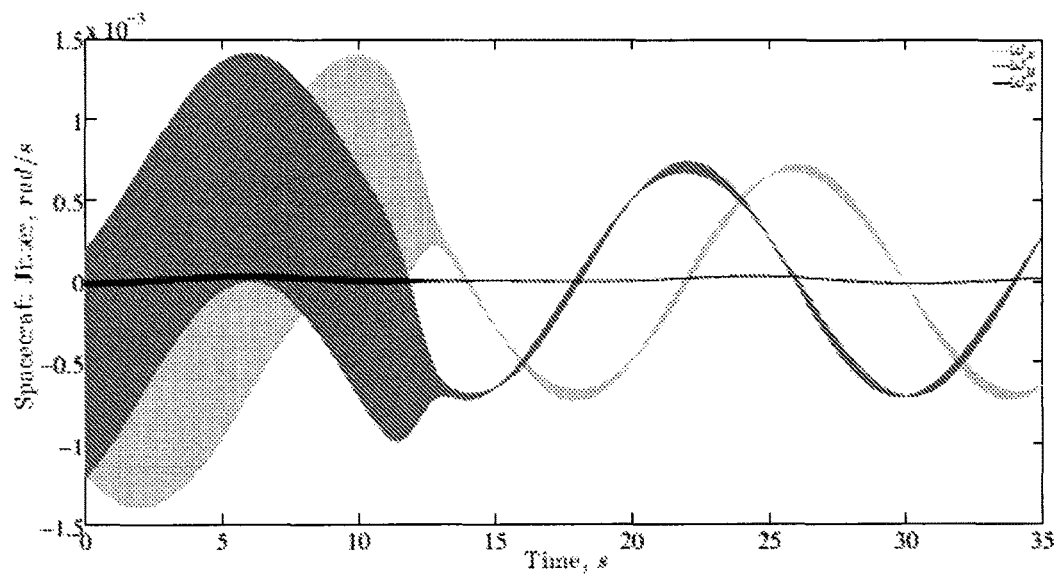
FIG. 17 illustrates another simulation of jitter in a three flywheel system.
Figure 18:
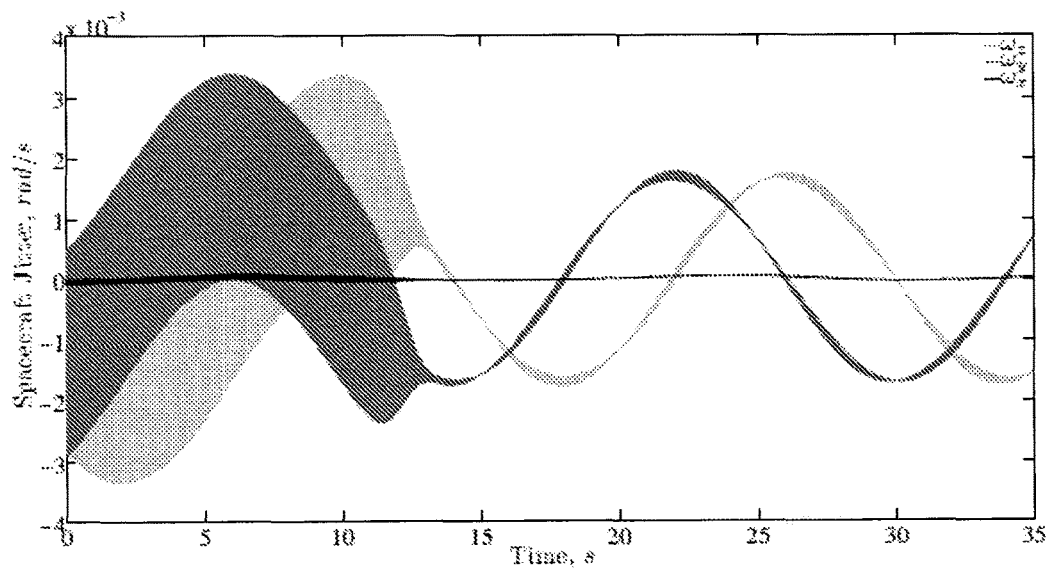
FIG. 18 illustrates yet another simulation of jitter in a three flywheel system.

Consider now the effect of failure of one or more flywheels in the three-flywheel system according to various embodiments. As mentioned, each of the flywheels in a three-flywheel system is, in certain embodiments, capable of being controlled independently. While this provides a certain degree of redundancy, one might consider the system to have more points of failure compared to the single-flywheel system. It is therefore necessary to analyze the extent of performance degradation and the extent of capability retained by the partially failed system. With the possibility of failure of single or multiple flywheels at any instant, there are a total of seven failure modes. But, since the flywheels 44 and 46 are identical, there are only four distinct, non-trivial modes of failure, and these are each described, in turn, below. A fully functional or a completely failed system is, of course, considered trivial. Simulations for all four failure modes are further provided below in conjunction with a three-flywheel system with a balancing quality of G2.5 (arbitrarily selected). The parameters used for simulation are given in Table 4 (previously herein) and Tables B.1 through B.3 (below). Corresponding FIGS. 17 and 18 are also provided.

TABLE B.2

G2.5 Three-Flywheel System Simulation Parameters (High Fidelity)

| Parameter | Value | Units |
|---|---|---|
| Flywheel $F_1$ eccentric masses | $me_1 = 0.3750 \times 10^{-3}$ | kg |
| Flywheel $F_2$ eccentric masses | $me_2 = 0.1922 \times 10^{-3}$ | kg |
| Flywheel $F_3$ eccentric masses | $me_3 = 0.1828 \times 10^{-3}$ | kg |
| Flywheel mass eccentricities | $^{F_1}r^{e_1} = {}^{F_2}r^{e_2} = {}^{F_3}r^{e_3} = 10^{-3}[1\ 1\ 1]^T$ | m |
| Inertia of Flywheel $F_1$ | $J_{o1}^{F_1} = \begin{bmatrix} 300.0075 & -0.0037 & -0.0037 \\ -0.0037 & 155.2888 & -0.0037 \\ -0.0037 & -0.0037 & 155.2888 \end{bmatrix} 10^{-7}$ | $kgm^2$ |
| Inertia of Flywheel $F_2$ | $J_{o2}^{F_2} = \begin{bmatrix} 150.0038 & -0.0019 & -0.0019 \\ -0.0019 & 75.6604 & -0.0019 \\ -0.0019 & -0.0019 & 75.6640 \end{bmatrix} 10^{-7}$ | $kgm^2$ |
| Inertia of Flywheel $F_3$ | $J_{o3}^{F_3} = \begin{bmatrix} 150.0037 & -0.0018 & -0.0018 \\ -0.0018 & 75.6638 & -0.0018 \\ -0.0018 & -0.0018 & 75.6638 \end{bmatrix} 10^{-7}$ | $kgm^2$ |
| Maximum static imbalance | 0.75 | gmm |
| Maximum dynamic Imbalance | 0.74 | $gmm^2$ |

TABLE B.3

G6.3 Three-Flywheel System Simulation Parameters (High Fidelity)

| Parameter | Value | Units |
|---|---|---|
| Flywheel $F_1$ eccentric masses | $me_1 = 0.0525 \times 10^{-3}$ | kg |
| Flywheel $F_2$ eccentric masses | $me_2 = 0.0269 \times 10^{-3}$ | kg |
| Flywheel $F_3$ eccentric masses | $me_3 = 0.0256 \times 10^{-3}$ | kg |
| Flywheel mass eccentricities | $^{F_1}r^{e_1} = {}^{F_2}r^{e_2} = {}^{F_3}r^{e_3} = 10^{-3}[1\ 1\ 1]^T$ | m |
| Inertia of Flywheel $F_1$ | $J_{o1}^{F_1} = \begin{bmatrix} 300.0180 & -0.0090 & -0.0090 \\ -0.0090 & 155.2993 & -0.0090 \\ -0.0090 & -0.0090 & 155.2993 \end{bmatrix} 10^{-7}$ | $kgm^2$ |
| Inertia of Flywheel $F_2$ | $J_{o2}^{F_2} = \begin{bmatrix} 150.0092 & -0.0046 & -0.0046 \\ -0.0046 & 75.6694 & -0.0046 \\ -0.0046 & -0.0046 & 75.6694 \end{bmatrix} 10^{-7}$ | $kgm^2$ |
| Inertia of Flywheel $F_3$ | $J_{o3}^{F_3} = \begin{bmatrix} 150.0088 & -0.0044 & -0.0044 \\ -0.0044 & 75.6689 & -0.0044 \\ -0.0044 & -0.0044 & 75.6689 \end{bmatrix} 10^{-7}$ | $kgm^2$ |
| Maximum static imbalance | 1.8 | gmm |
| Maximum dynamic Imbalance | 1.8 | $gmm^2$ |

(1) Exemplary Scenario Involving Failure of Flywheel 42

Figure 10:
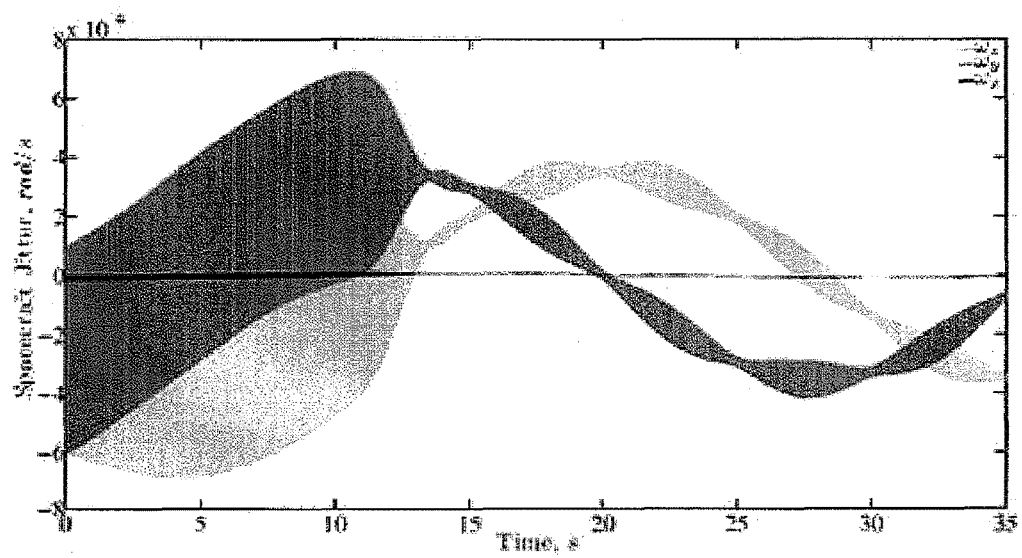
FIG. 10 illustrates a simulation of jitter in a three flywheel system with a failed center flywheel, according to various embodiments of the present invention.

Flywheel 42, which is the larger of the three flywheels, accounts for half the axial inertia and mass of the three-flywheel system according to various embodiments. Upon failure of this flywheel, the system loses its ability to produce 50% of the actuator's torque output and momentum storage capability. Referring to Equation 17 provided elsewhere herein, it may be understood that the jitter of this two-flywheel system can be minimized by the phase relation $\varphi_2=\varphi_3\pm\pi$. Partial balance can therefore be achieved. The simulation result of such a system is shown in FIG. 10. As may be understood therefrom, the simulation starts with a failed flywheel 42. Flywheels 44 and 46 are in phase at this point. At 10 seconds simulation time, these flywheels are commanded to achieve a phase difference of it radians, which yields a statically balanced system. With verification from Equation 17, it is noted that only static balance is achieved with such a system. Dynamic imbalance is still present which causes some jitter as is also evident with reference to FIG. 10.

(2) Exemplary Scenario Involving Failure of Flywheel 44 or 46

According to various embodiments, flywheels 44 and 46 have identical mass properties, and each flywheel accounts for 25% of the axial inertia of the three-flywheel system. Failure of either one of the flywheel, therefore accounts for a 25% deficit in the actuator's torque output and momentum storage capability.

Figure 11:
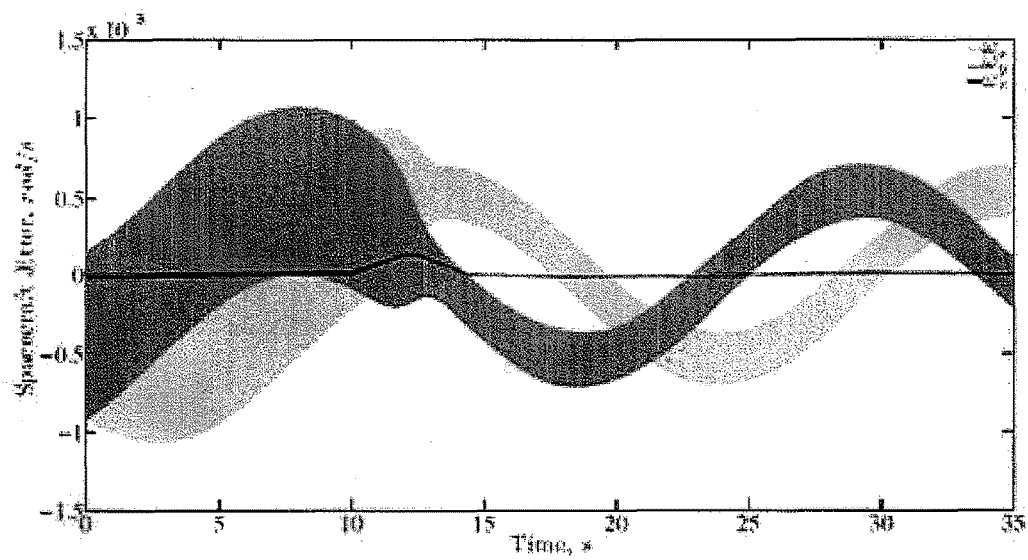
FIG. 11 illustrates a simulation of jitter in a three flywheel system with either a failed left or right flywheel, according to various embodiments of the present invention.

Referring to Equation 17, it may be understood that the jitter of this two-flywheel system according to various embodiments may be minimized by the phase relation $\varphi_1=\varphi_2\pm\pi$, or $\varphi_1=\varphi_3\pm\pi$. The simulation result of such a system is shown in FIG. 11. With reference thereto, it may be understood that the simulation starts with a failed flywheel 46, and the flywheels 42 and 44 are in phase at this instant. At 10 seconds simulation time, flywheel 44 is commanded to gain it radians over flywheel 42, which provides partial static balance to the system. It may also be understood from FIG. 11 that the residual jitter is higher in magnitude when compared to the previous case where complete static balance is achieved. The residual jitter is due to both static and dynamic imbalance. The change in the x-component of the spacecraft angular velocity as flywheel 44 is commanded to gain it radians over flywheel 42, as can also be understood with reference to FIG. 11.

In a fully functional three-flywheel system, or in a system with a failed flywheel 42, this effect is cancelled out due to opposing rotations by flywheel 44 and 46 as shown and described previously herein with reference to FIG. 7.

(3) Exemplary Scenario Involving Combined Failure of Flywheel 42 and Either Flywheel 44 or 46

Figure 12:
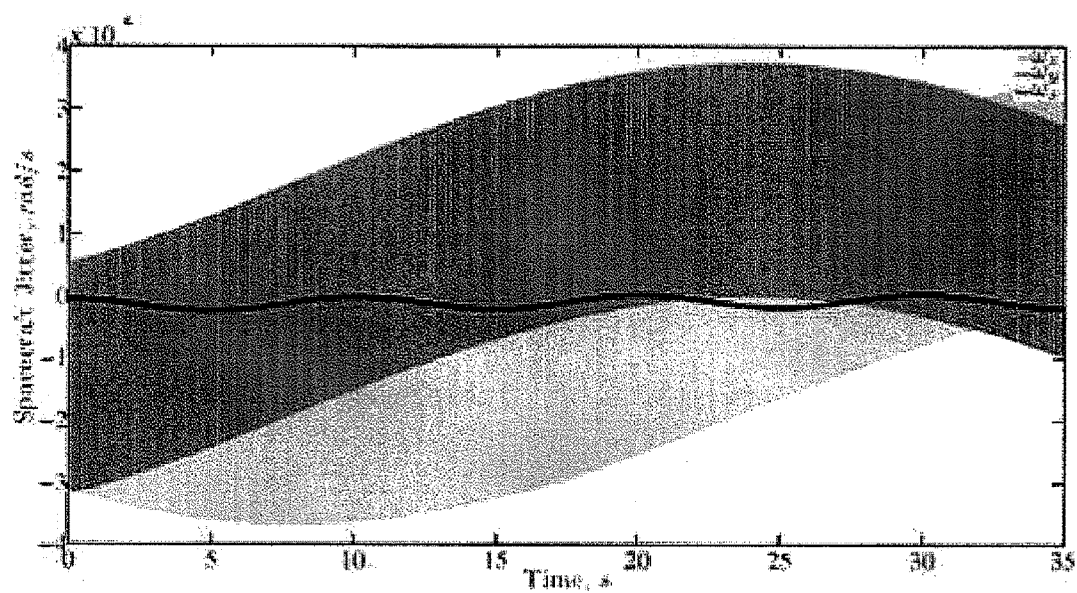
FIG. 12 illustrates a simulation of jitter in a three flywheel system with a failed center or left flywheel, according to various embodiments of the present invention.

This is an exemplary and non-limiting scenario involving multiple flywheel failure and the resulting system is identical to a single-flywheel system with reduced torque capacity. In this particular case, with failure of flywheels 42 and either 44 or 46, 75% of the axial inertia of the three-flywheel system is lost. The actuator therefore retains only 25% of its torque output and momentum storage capability. The simulation result of such a system is shown in FIG. 12, and its similarity with FIG. 4(*a*) is readily observed. However, it should be noted that the frequency of precession is lower due to the lower angular momentum of the flywheels.

(4) Exemplary Scenario Involving Failure of Either Flywheel 44 or 46

Figure 13:
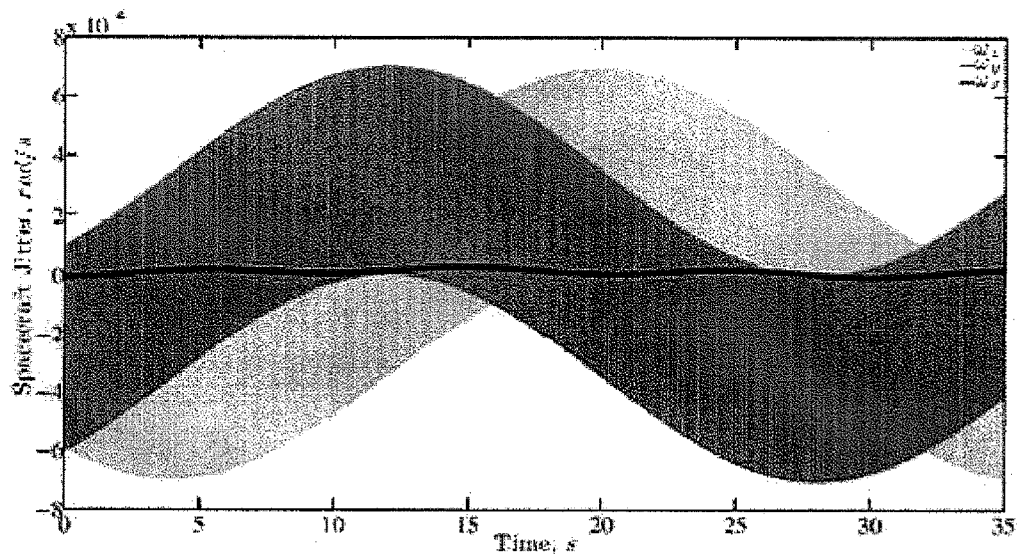
FIG. 13 illustrates a simulation of jitter in a three flywheel system with a failed left and right flywheel, according to various embodiments of the present invention.

This exemplary scenario is identical to the previous but only 50% of the axial inertia of the three-flywheel system is lost. The actuator therefore retains the remaining 50% of its capacity from flywheel 421. The simulation result of such a system is shown in FIG. 13.

(5) Summary Remarks Concerning Exemplary Scenarios

Figure 14:
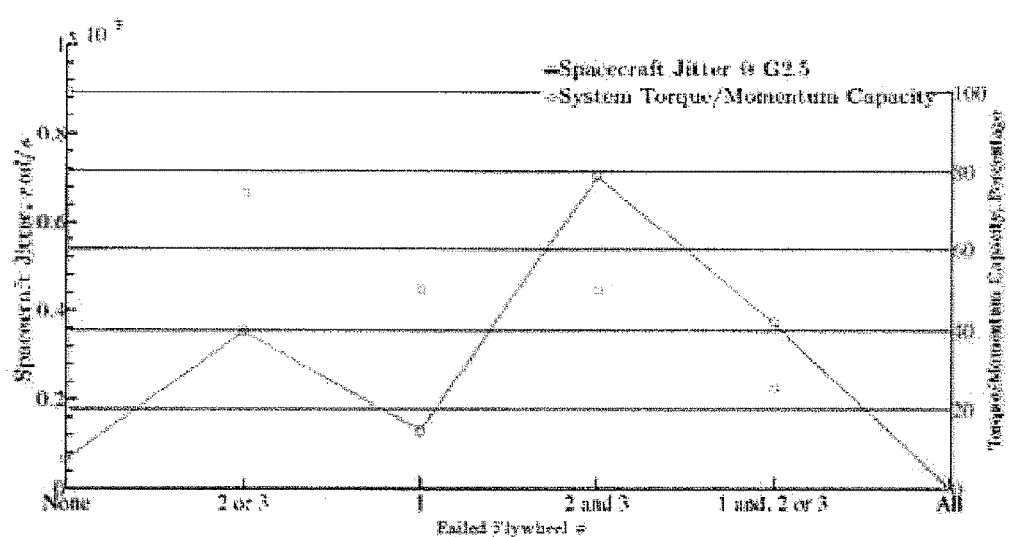
FIG. 14 illustrates a comparison of jitter measured in the failure models of the three flywheel system, according to various embodiments of the present invention.

A comparison of all failure modes according to various embodiments is illustrated in FIG. 14. The horizontal axis indicates the failure condition of the system. The two vertical axes represent the jitter magnitude, and remnant torque capacity of the failed system. Maximum torque and minimum jitter is achieved in a fully functional three-flywheel system. The torque capacity of the actuators, and the ability to perform balancing is compromised with flywheel failures. The condition with failure of flywheels 44 and 46 represents the case with the largest jitter to torque ratio and this is verified by the fact that this case is identical to a single-flywheel system. The three-flywheel system therefore provides at least two layers of redundancy, but with reduced capacity.

It should be readily understood therefrom that partial balance can be achieved in case of single flywheel failure. The system according to various embodiments therefore offers a significant advantage over the single flywheel system, in which failure results in 100% loss of actuator capacity.

E. Power and Mass Trades

Figure 15:
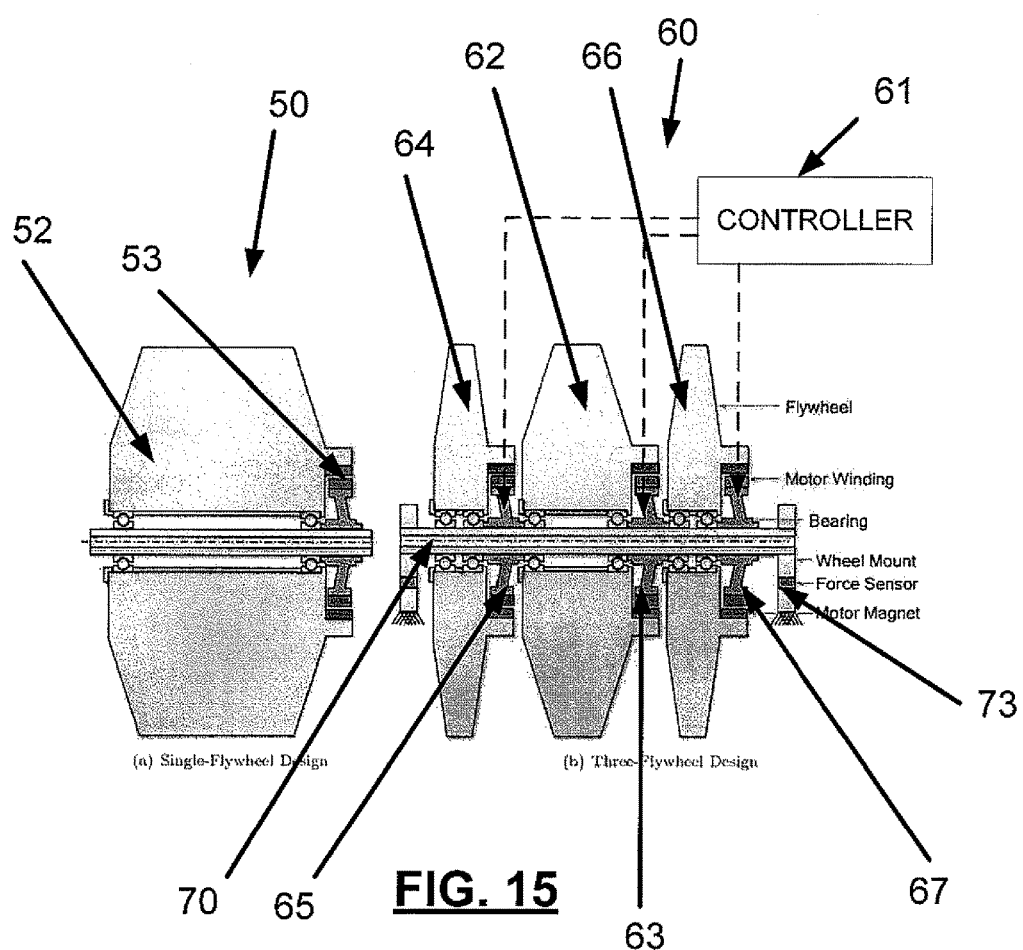
FIG. 15 illustrates a schematic of an example single flywheel system and an example three-flywheel system according to various embodiment of the present invention.

The benefits of the three-flywheel system according to various embodiments as described herein include at least jitter reduction capability and redundancy. These benefits and/or advantages may be, in certain embodiments, however, provided at the cost of additional mass and power. An estimate of the power consumption and mass of the three-flywheel system is thus herein described and compared with that of a single-flywheel system. In order to make these estimates, indicative design configurations of single- and three-flywheel systems are needed. One such design configuration is shown in FIG. 15. The designs shown in FIG. 15 are, of course, not ideal mechanical designs, and are only provided as an indicative reference to show the various components present in such a system. However, the indicative design is sufficient to make informed observations of the mass and power consumption.

According to various embodiments, with continued reference to FIG. 15, appropriate components are selected from commercially available hardware, and their mass and power characteristics are obtained from the manufacturer's datasheet. The selection of these components was based on the mass and inertia of the flywheels they are associated with. For instance, the single-flywheel system comprises a motor with a torque capacity twice as that of flywheel 42, and four times as that of flywheels 44, and 46 of the three-flywheel system. This is based on the fact that the flywheel associated with the single flywheel system has mass and axial inertia equal to twice that of flywheel 42, and four times that of flywheels 44 and 46. Similarly, the single-flywheel system also has bearings that are bigger, and hence provide greater viscous resistance as compared to the bearings of the three-flywheel system.

In certain embodiments, each flywheel may have its own encoder (not shown in figures) or any other angular feedback device to provide feedback necessary for flywheel control. This feature is common to both single-flywheel and three-flywheel systems. The flywheel, motor, encoder, and bearing data of a single flywheel system according to various embodiments are given in Table 6 below.

TABLE 6

Mass and Power Parameters of Single-Flywheel System

| Variable | Value | Units |
|---|---|---|
| Flywheel Mass, $m_w$ | 0.3 | kg |
| Motor Mass, $m_m$ | 0.06 | kg |
| Bearing Mass, $m_b$ | 0.005 | kg |
| Encoder Mass, $m_{en}$ | 0.02 | kg |
| Mass of housing, $m_h$ | 0.3 | kg |
| Motor viscous damping coefficient, $c_m$ | $3 \times 10^{-7}$ | Nms |
| Bearing viscous damping coefficient, $c_b$ | $5 \times 10^{-7}$ | Nms |
| Motor cogging torque, $T_{cog}$ | $1.2 \times 10^{-3}$ | Nm |
| Flywheel speed, $\Omega$ | 10000 | rpm |

An estimate of the mass is provided for the single-flywheel and three-flywheel systems according to various embodiments in Table 7 below.

TABLE 7

Mass Comparison Between Single- and Triple-Flywheel Systems

| | Mass of Flywheel System (kg) | |
|---|---|---|
| Component | Single | Triple |
| Number of flywheels | 1 | 1 + 1 + 1 = 3 |
| Mass of flywheel(s) | $m_w$ | $(0.25 + 0.5 + 0.25) m_w$ |
| Number of motors | 1 | 1 + 1 + 1 = 3 |
| Mass of motor(s) | $m_m$ | $(0.4 + 0.66 + 0.4) m_m$ |
| Number of bearings | 2 | 2 + 2 + 2 = 6 |
| Mass of bearings | $2m_b$ | $2 (0.5 + 0.5 + 0.5) m_b$ |
| Number of encoders | 1 | 1 + 1 + 1 = 3 |
| Mass of encoder(s) | $m_{en}$ | $3m_{en}$ |
| Mass of housing and other structures | $m_h$ | $1.2m_h$ |
| Total mass | $m_w + m_m + 2m_b + m_{en} + m_h = 0.6900$ (from Table: 6) | $m_w + 1.46m_m + 3m_b + 3m_{en} + 1.2m_h = 0.8266$ (from Table: 6) |

In Table 7, the mass of the components of the three flywheel system are listed as a percentage of the mass of the corresponding component in a single flywheel system, so that the increase in mass of each category of components is clearly depicted. For instance, in at least one embodiment the mass of the motor chosen for flywheel 42 is 40 g, which is 66% of the mass of the motor in a single-flywheel system. Similarly, 44 and 46 have motors with mass equal to 26.5 g, which is 44% of the single-flywheel system motor. Based on the indicative design, and the components considered here, it may be understood from Table 7 that the three-flywheel system is about 20% heavier compared to the single flywheel system.

An estimate of the quiescent power consumption of single-flywheel and three-flywheel systems according to various embodiments is provided in Table 8 below.

TABLE 8

Power Comparison Between Single- and Triple-Flywheel Systems

| | Power Consumption of Flywheel System (Watts) | |
|---|---|---|
| Contributing Factor | Single | Triple |
| Viscous damping of motor | $\Omega^2 (c_m)$ | $\Omega^2 (0.33 + 0.55 + 0.33) c_m$ |
| Viscous damping of bearings | $2 \Omega^2 (c_b)$ | $2 \Omega^2 (0.6 + 0.6 + 0.6) c_b$ |

TABLE 8-continued

Power Comparison Between Single- and Triple-Flywheel Systems

| | Power Consumption of Flywheel System (Watts) | |
|---|---|---|
| Contributing Factor | Single | Triple |
| Cogging torque of motor | $\Omega (T_{cog})$ | $\Omega (0.4 + 0.6 + 0.41) T_{cog}$ |
| Total power | $\Omega^2 (c_m + 2c_b) + \Omega (T_{cog}) = 2.68$ W (from Table: 6) | $\Omega^2 (1.21c_m + 3.6c_b) + \Omega (1.4T_{cog}) = 4.13$ W (from Table: 6) |

As may be understood from this table, the power consumption in certain embodiments is based on the viscous friction in the motor and bearings, and the cogging resistance offered by the motor magnets. The power consumption due to viscous friction is given as the product of the coefficient of viscous friction (in Nms) and the square of the angular velocity (in rad/s). A factor of two is included as there are two bearings per flywheel. The power consumption due to cogging resistance is given by the product of the cogging torque and the angular velocity.

Similar to Table 7, the power parameters for the three-flywheel system in Table 8 are expressed as a percentage of the corresponding parameter value in a single-flywheel system. For instance, the viscous damping coefficient of the bearing used in the three-flywheel system is $3 \times 10^{-7}$ Nms, which is 60% of the corresponding value in a single-flywheel system. Based on the indicative design, and the component characteristics considered here, it may be understood from Table 8 that at 10000 rpm, the three-flywheel system consumes about 1.5 W more than the single-flywheel system.

Figure 16:
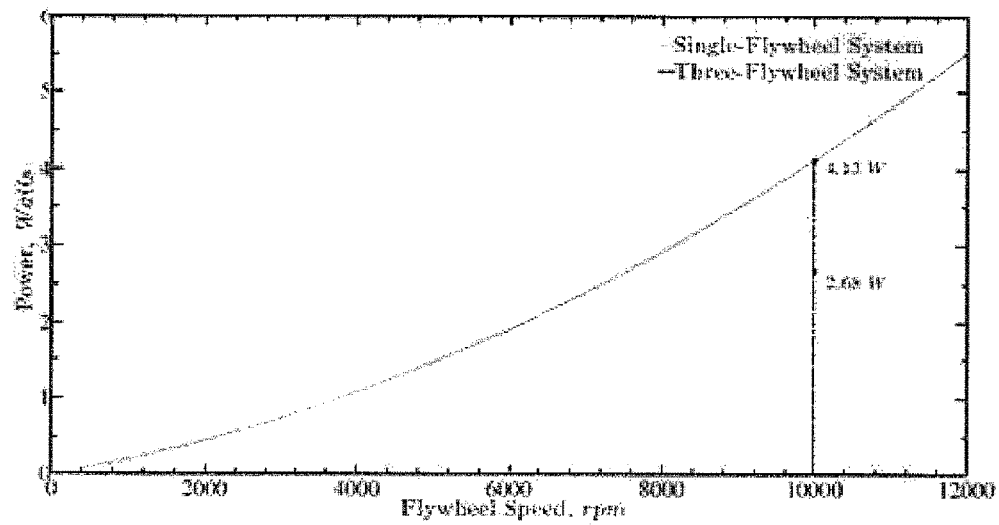
FIG. 16 illustrates a comparison of power consumption of the single flywheel system and the three flywheel system, according to various embodiments of the present invention.

For an exemplary spacecraft with four actuators, according to various embodiments the total increase in power consumption is about 6 W. Since the power consumption depends on the speed of the flywheel, a plot of the power consumptions of single-flywheel and three-flywheel systems as a function of flywheel speed is shown in FIG. 16. Thus, the difference in power consumption between single-flywheel and three-flywheel systems is smaller at lower angular velocities of the flywheel. It should be noted that the power and mass comparisons are based only on the indicative design in FIG. 15, actuator capacity, and component characteristics considered in Table 6.

Turning now with particular focus upon FIG. 15, such illustrates an example three-flywheel system 60 and an example single-flywheel system 50, both according to various embodiments described herein. The three-flywheel system 60 comprises a first flywheel 62, a second flywheel 64, and a third flywheel 66. The first flywheel 62, second flywheel 64, and third flywheel 66 are in certain embodiments axially aligned and in operable engagement with one another (e.g., their centers are configured to rotate around the same axis). In these and still other embodiments, the common shaft 70 on which the flywheels are mounted may be made hollow to route wires from motors and encoders (not shown) to motor controllers.

According to various embodiments, each flywheel may be configured to be independently controlled in order to manipulate the phase difference therebetween. In such manner, in some embodiments, the three-flywheel system 60 (or the spacecraft (not shown) that includes the three-flywheel system) may include a controller 61 that is configured to control the rotation of each flywheel, respectively, to obtain a desired phase difference. Since the flywheels in the three-flywheel system 60 are controlled independently, the system offers double redundancy in the event of failure of a bearing or motor, but with reduced capacity.

In certain embodiments, the three-flywheel system 60 may comprise a first motor 63 configured to control the first flywheel 62, a second motor 65 configured to control the second flywheel 64, and a third motor 67 configured to control the third flywheel 66. In some embodiments, each of the first motor, second motor, and third motor may comprise a frameless brushless DC motor. For example, brushless DC motors may be used with the permanent magnet rotors fixed directly to the flywheels. Additionally, in some embodiments, a force sensor 73 may be mounted to the three flywheel system 60.

The single flywheel system 50 according to various embodiments also comprises a single flywheel 51 with one motor 53. In such a manner, the single flywheel system has twice the inertia of the center flywheel 62 in the three-flywheel system 60 according to various embodiments.

F. Identifying the Flywheel Phase Angle

Yet another aspect of jitter reduction using the three-flywheel approach is aligning the flywheel phases as per Equation 9 so that static and dynamic balance is achieved according to various embodiments. Knowledge of the flywheel phase angles is therefore central to implementing the approach on orbit. Since the phase of the flywheel depends on the location of the flywheel's eccentric c.m., there is no direct method of measuring the phase angles.

Instead, according to various embodiments, a method to infer the phase angles is devised. In certain embodiments, a pair of force sensors is used in between the flywheel supports and the spacecraft structure, as shown in a non-limiting fashion in FIG. 15. Each flywheel is spun individually while the others are stationary so that the effect of jitter due to that particular flywheel can be measured at the force sensors. Since the flywheel's encoder provides continuous information about the flywheel's angle relative to a known reference, the flywheel phase can be identified by comparing the time stamped histories of the force sensor and encoder outputs. This method is similar to the ones used in traditional balancing machines to perform rotor balancing. Additionally, the force sensor data can be used to monitor the health of the bearings, and therefore providing the ability to predict bearing failures.

In various embodiments, the flywheel phases may be continuously controlled to achieve static and dynamic balance. The process of controlling the phases presents the following exemplary and non-limiting challenges: (1) there is no direct method to measure the phase of the flywheel as it depends on the unknown cm of the flywheel; and (2) the flywheels should be controlled such that there is no net reaction torque applied on the spacecraft.

Various embodiments of the present invention also provide a method for balancing flywheels used in momentum exchange devices to minimize jitter. For example, the method may include providing a three-flywheel system according to any example embodiment described herein and then independently controlling each flywheel to manipulate the phase difference therebetween. Such example techniques provide the ability to maintain a more precise balance compared to a single-flywheel system even in the event of changes in the individual flywheel imbalance. Detailed simulations, such as described elsewhere herein, show the effectiveness of the approach, including a twenty-fold improvement in the magnitude of jitter.

Since the proposed method according to various embodiments does not require prior precision balancing of the flywheel it may lead to potential savings in cost and time. Further, since the static and dynamic balance of the system can be continually adjusted (e.g., be dynamically balanced on the fly while in orbit/operation), the system can adapt to partial changes in the individual flywheel imbalances (e.g., due to eccentricity shifts occurring from various phenomena). The three-flywheel may, in certain embodiments, be used together with other isolation systems to further improve the jitter environment. During analysis of the effect of failure of one or more flywheels of the three-flywheel system according to various embodiments, it was noted that in the event of failure of a single flywheel, partial balance can be achieved with the remaining two flywheels. The ability to control each flywheel independently also provides certain degree of redundancy to the system. Using indicative designs, power and mass trades between the single-flywheel and three-flywheel systems were presented. The ability to achieve significant improvement in pointing stability of the spacecraft may justify increase in the mass and power consumption. It is understood that the above-discussed simulations were not meant to be limiting, as other simulations may be performed in alternative embodiments.

V. CONCLUSION

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A flywheel assembly for reducing the amplitude of attitude jitter, the flywheel assembly comprising:
   a first flywheel;
   a second flywheel; and
   a third flywheel,
   wherein:
      the first flywheel, the second flywheel, and the third flywheel are axially aligned and in operable engagement with one another;
      each of the first, second, and third flywheels is configured to be independently controlled in order to manipulate the phase difference therebetween; and
      an imbalance due to eccentricity in the first flywheel and an imbalance due to eccentricity in the third flywheel are approximately the same.

2. The flywheel assembly according to claim 1, wherein the first flywheel, second flywheel, and third flywheel are each configured to rotate about the same axis.

3. The flywheel assembly according to claim 1, wherein:
   the second flywheel is positioned axially between the first flywheel and the third flywheel; and
   the first flywheel has a first eccentric center of mass, the second flywheel has a second eccentric center of mass, and the third flywheel has a third eccentric center of mass.

4. The flywheel assembly according to claim 1, wherein the imbalance due to eccentricity in the second flywheel is approximately double that of each of the first flywheel and third flywheel.

5. The flywheel assembly according to claim 4, wherein the variation of static and dynamic imbalance between the flywheels is less than 2.5%.

6. The flywheel assembly according to claim 1, further comprising a controller, the controller configured to independently control the rotation of each flywheel to obtain a desired phase difference.

7. The flywheel assembly according to claim 6, wherein:
the second flywheel is positioned axially between the first flywheel and the third flywheel; and
the controller is configured to cause rotation of the first flywheel to increase with respect to rotation of the second flywheel and cause rotation of the third flywheel to decrease with respect to rotation of the second flywheel for a predetermined period of time to reduce the amplitude of attitude jitter.

8. The flywheel assembly according to claim 7, wherein:
the controller is configured to cause rotation of the first flywheel to increase using a trapezoidal angular velocity pulse; and
the controller is further configured to cause rotation of the third flywheel to decrease using an opposing trapezoidal angular velocity pulse.

9. The flywheel assembly according to claim 5, wherein the controller is configured to control the rotation and relative phase of each flywheel to achieve static and dynamic imbalance.

10. The flywheel assembly according to claim 1, further comprising:
a first motor configured to rotate the first flywheel;
a second motor configured to rotate the second flywheel; and
a third motor configured to rotate the third flywheel.

11. The flywheel assembly according to claim 10, wherein the first, second, and third motors are each a frameless brushless DC motor.

12. The flywheel assembly according to claim 1, wherein the flywheel assembly is mounted in a common housing.

13. The flywheel assembly according to claim 1, wherein the overall mass and axial inertia of the flywheel assembly is substantially the same as the overall mass and inertia of a single flywheel assembly capable of being used in an identical spacecraft.

14. The flywheel assembly according to claim 1, wherein the flywheel assembly is configured to be mounted within a spacecraft such that the spacecraft jitter can be stabilized by independently controlling the speed of rotation of at least one of the flywheels to adjust the phase difference therebetween.

15. The flywheel assembly according to claim 1, wherein the flywheel assembly is configured to provide at least two layers of redundancy with a reduced capacity relative to a conventional flywheel assembly.

16. The flywheel assembly according to claim 15, wherein reduced capacity is realized via a total combined mass of the first, second, and third flywheels of the assembly being substantially equal to a total mass of a conventional single flywheel assembly.

17. The flywheel assembly according to claim 1, wherein a total combined mass of the first, second, and third flywheels of the assembly is substantially equal to a total mass of a conventional single flywheel assembly.

18. A spacecraft comprising:
a flywheel assembly for reducing the amplitude of attitude jitter in the spacecraft, the flywheel assembly comprising:
a first flywheel;
a second flywheel; and
a third flywheel,
wherein:
the first flywheel, second flywheel, and third flywheel are axially aligned and in operable engagement with one another;
each of the first, second, and third flywheels is configured to be independently controlled in order to manipulate the phase difference therebetween; and
an imbalance due to eccentricity in the first flywheel and an imbalance due to eccentricity in the third flywheel are approximately the same.

19. The spacecraft according to claim 18, further comprising a controller configured to independently control the rotation of each flywheel to obtain a desired phase difference to rebalance the spacecraft.

20. The spacecraft according to claim 18, wherein:
the second flywheel is positioned axially between the first flywheel and the third flywheel; and
the controller is configured to cause rotation of the first flywheel to increase with respect to rotation of the second flywheel and cause rotation of the third flywheel to decrease with respect to rotation of the second flywheel for a predetermined period of time to reduce the amplitude of attitude jitter of the spacecraft.

21. The spacecraft according to claim 18, wherein:
the flywheel assembly is configured to provide at least two layers of redundancy with a reduced capacity relative to a conventional flywheel assembly; and
the reduced capacity is realized via a total combined mass of the first, second, and third flywheels of the assembly being substantially equal to a total mass of the conventional single flywheel assembly.

22. A method for reducing the amplitude of attitude jitter, the method comprising:
providing a flywheel assembly comprising:
a first flywheel;
a second flywheel; and
a third flywheel, wherein the first flywheel, second flywheel, and third flywheel are axially aligned and in operable engagement with one another; and
independently controlling each flywheel so as to manipulate the phase difference therebetween, wherein said independent controlling of each flywheel comprises rotating the first flywheel to increase with respect to rotation of the second flywheel and rotating the third flywheel to decrease with respect to rotation of the second flywheel for a predetermined period of time to reduce the amplitude of attitude litter.

23. The method according to claim 22, wherein:
the second flywheel is positioned axially between the first flywheel and the third flywheel.

24. The method according to claim 22, wherein:
the first flywheel has a first eccentric center of mass, the second flywheel has a second eccentric center of mass, and the third flywheel has a third eccentric center of mass.

25. The method according to claim 22, wherein:
the flywheel assembly is configured to provide at least two layers of redundancy with a reduced capacity relative to a conventional flywheel assembly; and
the reduced capacity is realized via a total combined mass of the first, second, and third flywheels of the assembly being substantially equal to a total mass of the conventional single flywheel assembly.

* * * * *